(12) United States Patent
Eaton et al.

(10) Patent No.: US 9,357,317 B2
(45) Date of Patent: May 31, 2016

(54) HEARING AID SYSTEMS

(71) Applicant: Starkey Laboratories, Inc., Eden Prairie, MN (US)

(72) Inventors: Anthony M. Eaton, Hartley Wintney (GB); Jerome C. Ruzicka, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 13/953,562

(22) Filed: Jul. 29, 2013

(65) Prior Publication Data

US 2013/0315424 A1 Nov. 28, 2013

Related U.S. Application Data

(63) Continuation of application No. 11/212,406, filed on Aug. 26, 2005, now Pat. No. 8,503,703, which is a continuation of application No. 09/492,913, filed on Jan. 20, 2000, now abandoned.

(51) Int. Cl.
*H04R 25/00* (2006.01)
*H04M 1/60* (2006.01)

(52) U.S. Cl.
CPC ............ *H04R 25/554* (2013.01); *H04R 25/70* (2013.01); *H04M 1/6041* (2013.01); *H04M 2250/02* (2013.01); *H04R 2225/55* (2013.01)

(58) Field of Classification Search
USPC ............................ 381/60, 312–321; 709/220
See application file for complete search history.

(56) References Cited

U.S. PATENT DOCUMENTS

| 3,527,901 | A | 9/1970 | Geib |
|---|---|---|---|
| 4,188,667 | A | 2/1980 | Graupe et al. |
| 4,366,349 | A | 12/1982 | Adelman |
| 4,396,806 | A | 8/1983 | Anderson |
| 4,419,544 | A | 12/1983 | Adelman |
| 4,425,481 | A | 1/1984 | Mansgold et al. |
| 4,471,490 | A | 9/1984 | Bellafiore |
| 4,548,082 | A | 10/1985 | Engebretson et al. |
| 4,606,329 | A | 8/1986 | Hough |
| 4,617,429 | A | 10/1986 | Bellafiore |
| 4,628,907 | A | 12/1986 | Epley |
| 4,634,815 | A | 1/1987 | Marquis |

(Continued)

FOREIGN PATENT DOCUMENTS

| AU | 2007216810 A1 | 7/2011 |
|---|---|---|
| DE | 4339898 A1 | 11/1993 |

(Continued)

OTHER PUBLICATIONS

"U.S. Appl. No. 08/782,328, Non Final Office Action mailed Jul. 7, 1998", 7 pgs.
"U.S. Appl. No. 08/896,484, Advisory Action mailed Jan. 29, 2002", 3 pgs.
"U.S. Appl. No. 08/896,484, Final Office Action mailed May 9, 2000", 7 pgs.
"U.S. Appl. No. 08/896,484, Final Office Action mailed Sep. 10, 2001", 14 pgs.
"U.S. Appl. No. 08/896,484, Non Final Office Action mailed Feb. 28, 2001", 16 pgs.
"U.S. Appl. No. 08/896,484, Non Final Office Action mailed Aug. 10, 1999", 6 pgs.

(Continued)

*Primary Examiner* — Sunita Joshi
(74) *Attorney, Agent, or Firm* — Schwegman Lundberg & Woessner, P.A.

(57) ABSTRACT

Systems, structures, and methods are provided to fit, program, or upgrade a hearing aid system to a patient. One embodiment includes the use of a mobile device to interact with the hearing aid system through a short-range network. The mobile device is also adapted to communicate with a server through a long-range wireless network. The server may reside on the Internet.

19 Claims, 12 Drawing Sheets

(56) References Cited

U.S. PATENT DOCUMENTS

| | | |
|---|---|---|
| 4,636,876 A | 1/1987 | Schwartz |
| 4,637,402 A | 1/1987 | Adelman |
| 4,652,702 A | 3/1987 | Yoshii |
| 4,657,106 A | 4/1987 | Hardt |
| 4,680,799 A | 7/1987 | Henneberger |
| 4,682,248 A | 7/1987 | Schwartz |
| 4,689,820 A | 8/1987 | Kopke et al. |
| 4,706,778 A | 11/1987 | Topholm |
| 4,712,245 A | 12/1987 | Lyregaard |
| 4,731,850 A | 3/1988 | Levitt et al. |
| 4,735,759 A | 4/1988 | Bellafiore |
| 4,755,889 A | 7/1988 | Schwartz |
| 4,756,312 A | 7/1988 | Epley |
| 4,760,778 A | 8/1988 | Simelunas et al. |
| 4,763,752 A | 8/1988 | Haertl et al. |
| 4,776,322 A | 10/1988 | Hough et al. |
| 4,791,672 A | 12/1988 | Nunley et al. |
| 4,800,982 A | 1/1989 | Carlson |
| 4,811,402 A | 3/1989 | Ward |
| 4,815,138 A | 3/1989 | Diethelm |
| 4,817,609 A | 4/1989 | Perkins et al. |
| 4,834,211 A | 5/1989 | Bibby et al. |
| 4,867,267 A | 9/1989 | Carlson |
| 4,869,339 A | 9/1989 | Barton |
| 4,870,688 A | 9/1989 | Voroba et al. |
| 4,870,689 A | 9/1989 | Weiss |
| 4,879,749 A | 11/1989 | Levitt et al. |
| 4,879,750 A | 11/1989 | Nassler |
| 4,880,076 A | 11/1989 | Ahlberg et al. |
| 4,882,762 A | 11/1989 | Waldhauer |
| 4,887,299 A | 12/1989 | Cummins et al. |
| 4,920,570 A | 4/1990 | West et al. |
| 4,937,876 A | 6/1990 | Biermans |
| 4,947,432 A | 8/1990 | Topholm |
| 4,953,215 A | 8/1990 | Weiss et al. |
| 4,961,230 A | 10/1990 | Rising |
| 4,962,537 A | 10/1990 | Basel et al. |
| 4,966,160 A | 10/1990 | Birck et al. |
| 4,972,487 A | 11/1990 | Mangold et al. |
| 4,972,488 A | 11/1990 | Weiss et al. |
| 4,972,492 A | 11/1990 | Tanaka et al. |
| 4,975,967 A | 12/1990 | Rasmussen |
| 4,977,976 A | 12/1990 | Major |
| 4,989,251 A | 1/1991 | Mangold |
| 5,002,151 A | 3/1991 | Oliveira et al. |
| 5,003,607 A | 3/1991 | Reed |
| 5,003,608 A | 3/1991 | Carlson |
| 5,008,943 A | 4/1991 | Arndt et al. |
| 5,012,520 A | 4/1991 | Steeger |
| 5,014,016 A | 5/1991 | Anderson |
| 5,016,280 A | 5/1991 | Engebretson et al. |
| 5,027,410 A | 6/1991 | Williamson et al. |
| 5,033,090 A | 7/1991 | Weinrich |
| 5,044,373 A | 9/1991 | Northeved et al. |
| 5,046,580 A | 9/1991 | Barton |
| 5,048,077 A | 9/1991 | Wells et al. |
| 5,048,092 A | 9/1991 | Yamagishi et al. |
| 5,061,845 A | 10/1991 | Pinnavaia |
| 5,068,902 A | 11/1991 | Ward |
| 5,083,312 A | 1/1992 | Newton et al. |
| 5,101,435 A | 3/1992 | Carlson |
| 5,111,419 A | 5/1992 | Morley, Jr. et al. |
| 5,133,016 A | 7/1992 | Clark |
| 5,142,587 A | 8/1992 | Kobayashi |
| 5,144,674 A | 9/1992 | Meyer et al. |
| 5,146,051 A | 9/1992 | Hermann |
| 5,166,659 A | 11/1992 | Navarro |
| 5,185,802 A | 2/1993 | Stanton |
| 5,195,139 A | 3/1993 | Gauthier |
| 5,197,332 A | 3/1993 | Shennib |
| 5,201,007 A | 4/1993 | Ward et al. |
| 5,202,927 A | 4/1993 | Topholm |
| 5,208,867 A | 5/1993 | Stites, III |
| 5,210,803 A | 5/1993 | Martin et al. |
| 5,220,612 A | 6/1993 | Tibbetts et al. |
| 5,222,151 A | 6/1993 | Nagayoshi et al. |
| 5,225,836 A | 7/1993 | Morley, Jr. et al. |
| 5,226,086 A | 7/1993 | Platt |
| 5,257,315 A | 10/1993 | Haertl et al. |
| 5,259,032 A | 11/1993 | Perkins et al. |
| 5,276,739 A | 1/1994 | Krokstad et al. |
| 5,277,694 A | 1/1994 | Leysieffer et al. |
| 5,282,253 A | 1/1994 | Konomi |
| 5,295,191 A | 3/1994 | Van Vroenhoven |
| 5,298,692 A | 3/1994 | Ikeda et al. |
| 5,303,305 A | 4/1994 | Raimo et al. |
| 5,303,306 A | 4/1994 | Brillhart et al. |
| 5,319,163 A | 6/1994 | Scott |
| 5,321,757 A | 6/1994 | Woodfill, Jr. |
| 5,327,500 A | 7/1994 | Campbell |
| 5,338,287 A | 8/1994 | Miller et al. |
| 5,343,319 A | 8/1994 | Moore |
| 5,345,509 A | 9/1994 | Hofer et al. |
| 5,347,477 A | 9/1994 | Lee |
| 5,357,251 A | 10/1994 | Morley, Jr. et al. |
| 5,357,576 A | 10/1994 | Arndt |
| 5,363,444 A | 11/1994 | Norris |
| 5,365,593 A | 11/1994 | Greenwood et al. |
| 5,373,149 A | 12/1994 | Rasmussen |
| 5,373,555 A | 12/1994 | Norris et al. |
| 5,381,484 A | 1/1995 | Claes et al. |
| 5,384,852 A | 1/1995 | Scharen |
| 5,387,875 A | 2/1995 | Tateno |
| 5,388,248 A | 2/1995 | Robinson et al. |
| 5,390,254 A | 2/1995 | Adelman |
| 5,395,168 A | 3/1995 | Leenen |
| 5,402,494 A | 3/1995 | Flippe et al. |
| 5,402,496 A | 3/1995 | Soli et al. |
| 5,404,407 A | 4/1995 | Weiss |
| 5,406,619 A | 4/1995 | Akhteruzzaman et al. |
| 5,416,847 A | 5/1995 | Boze |
| 5,418,524 A | 5/1995 | Fennell |
| 5,420,930 A | 5/1995 | Shugart, III |
| 5,422,855 A | 6/1995 | Eslick et al. |
| 5,425,104 A | 6/1995 | Shennib |
| 5,434,924 A | 7/1995 | Jampolsky |
| 5,440,449 A | 8/1995 | Scheer |
| 5,445,525 A | 8/1995 | Broadbent et al. |
| 5,448,637 A | 9/1995 | Yamaguchi et al. |
| 5,475,759 A | 12/1995 | Engebretson |
| 5,479,522 A | 12/1995 | Lindemann et al. |
| 5,481,616 A | 1/1996 | Freadman |
| 5,487,161 A | 1/1996 | Koenck et al. |
| 5,488,668 A | 1/1996 | Waldhauer |
| 5,500,901 A | 3/1996 | Geraci et al. |
| 5,500,902 A | 3/1996 | Stockham, Jr. et al. |
| 5,502,769 A | 3/1996 | Gilbertson |
| 5,515,424 A | 5/1996 | Kenney |
| 5,515,443 A | 5/1996 | Meyer |
| 5,530,763 A | 6/1996 | Aebi et al. |
| 5,531,787 A | 7/1996 | Lesinski et al. |
| 5,533,029 A | 7/1996 | Gardner |
| 5,535,282 A | 7/1996 | Luca |
| 5,540,597 A | 7/1996 | Budman et al. |
| 5,544,222 A | 8/1996 | Robinson et al. |
| 5,546,590 A | 8/1996 | Pierce |
| 5,553,151 A | 9/1996 | Goldberg |
| 5,553,152 A | 9/1996 | Newton |
| 5,555,490 A | 9/1996 | Carroll |
| 5,559,501 A | 9/1996 | Barzegar et al. |
| 5,561,446 A | 10/1996 | Montlick |
| 5,563,400 A | 10/1996 | Le Roux |
| 5,572,594 A | 11/1996 | Devoe et al. |
| 5,572,683 A | 11/1996 | Epolite et al. |
| 5,574,654 A | 11/1996 | Bingham et al. |
| 5,581,747 A | 12/1996 | Anderson |
| 5,590,373 A | 12/1996 | Whitley et al. |
| 5,602,925 A | 2/1997 | Killion |
| 5,603,096 A | 2/1997 | Gilhousen et al. |
| 5,604,812 A * | 2/1997 | Meyer .................. H04R 25/507 381/312 |
| 5,606,620 A | 2/1997 | Weinfurtner |
| 5,606,621 A | 2/1997 | Reiter et al. |
| 5,615,344 A | 3/1997 | Corder |

(56) References Cited

U.S. PATENT DOCUMENTS

| | | |
|---|---|---|
| 5,619,396 A | 4/1997 | Gee et al. |
| 5,626,629 A | 5/1997 | Faltys et al. |
| 5,640,490 A | 6/1997 | Hansen et al. |
| 5,645,074 A | 7/1997 | Shennib et al. |
| 5,649,001 A | 7/1997 | Thomas et al. |
| 5,659,621 A | 8/1997 | Newton |
| 5,664,228 A | 9/1997 | Mital |
| 5,666,125 A | 9/1997 | Luxon et al. |
| 5,671,368 A | 9/1997 | Chan et al. |
| 5,677,948 A | 10/1997 | Meister |
| 5,696,970 A | 12/1997 | Sandage et al. |
| 5,696,993 A | 12/1997 | Gavish |
| 5,708,720 A | 1/1998 | Meyer |
| 5,710,819 A | 1/1998 | Topholm et al. |
| 5,710,820 A | 1/1998 | Martin et al. |
| 5,717,771 A | 2/1998 | Sauer et al. |
| 5,717,818 A | 2/1998 | Nejime et al. |
| 5,721,783 A * | 2/1998 | Anderson .............. H04B 1/385 381/312 |
| 5,736,727 A | 4/1998 | Nakata et al. |
| 5,737,706 A | 4/1998 | Seazholtz et al. |
| 5,738,633 A | 4/1998 | Christiansen |
| 5,740,165 A | 4/1998 | Vannucci |
| 5,751,820 A | 5/1998 | Taenzer |
| 5,757,933 A | 5/1998 | Preves et al. |
| 5,784,602 A | 7/1998 | Glass et al. |
| 5,784,628 A | 7/1998 | Reneris |
| 5,785,661 A | 7/1998 | Shennib |
| 5,794,201 A | 8/1998 | Nejime et al. |
| 5,797,089 A | 8/1998 | Nguyen |
| 5,800,473 A | 9/1998 | Faisandier |
| 5,809,017 A | 9/1998 | Smith et al. |
| 5,812,936 A | 9/1998 | DeMont |
| 5,812,938 A | 9/1998 | Gilhousen et al. |
| 5,814,095 A | 9/1998 | Muller et al. |
| 5,819,162 A | 10/1998 | Spann et al. |
| 5,822,442 A | 10/1998 | Agnew et al. |
| 5,824,022 A | 10/1998 | Zilberman et al. |
| 5,825,631 A | 10/1998 | Prchal |
| 5,825,894 A | 10/1998 | Shennib |
| 5,827,179 A | 10/1998 | Lichter et al. |
| 5,835,611 A | 11/1998 | Kaiser et al. |
| 5,842,115 A | 11/1998 | Dent |
| 5,845,251 A | 12/1998 | Case |
| 5,852,668 A | 12/1998 | Ishige et al. |
| 5,861,968 A | 1/1999 | Kerklaan et al. |
| 5,862,238 A | 1/1999 | Agnew et al. |
| 5,864,708 A | 1/1999 | Croft et al. |
| 5,864,813 A | 1/1999 | Case |
| 5,864,820 A | 1/1999 | Case |
| 5,870,481 A | 2/1999 | Dymond et al. |
| 5,878,282 A | 3/1999 | Mital |
| 5,883,927 A | 3/1999 | Madsen et al. |
| 5,884,260 A | 3/1999 | Leonhard |
| 5,887,067 A | 3/1999 | Costa et al. |
| 5,890,016 A | 3/1999 | Tso |
| 5,909,497 A | 6/1999 | Alexandrescu |
| 5,910,997 A | 6/1999 | Ishige et al. |
| 5,915,031 A | 6/1999 | Hanright |
| 5,916,174 A | 6/1999 | Dolphin |
| 5,917,812 A | 6/1999 | Antonio et al. |
| 5,923,764 A | 7/1999 | Shennib |
| 5,926,388 A | 7/1999 | Kimbrough et al. |
| 5,926,500 A | 7/1999 | Odenwalder |
| 5,929,848 A | 7/1999 | Albukerk et al. |
| 5,930,230 A | 7/1999 | Odenwalder et al. |
| 5,956,330 A | 9/1999 | Kerns |
| 5,960,346 A | 9/1999 | Holshouser |
| 5,987,513 A | 11/1999 | Prithviraj et al. |
| 6,002,776 A | 12/1999 | Bhadkamkar et al. |
| 6,009,311 A | 12/1999 | Killion et al. |
| 6,009,480 A | 12/1999 | Pleso |
| 6,016,115 A | 1/2000 | Heubi |
| 6,016,962 A | 1/2000 | Nakata et al. |
| 6,021,207 A | 2/2000 | Puthuff et al. |
| 6,022,315 A | 2/2000 | Iliff |
| 6,023,570 A | 2/2000 | Tang et al. |
| 6,032,866 A | 3/2000 | Knighton et al. |
| 6,035,050 A | 3/2000 | Weinfurtner et al. |
| 6,041,046 A | 3/2000 | Scott et al. |
| 6,041,129 A | 3/2000 | Adelman |
| 6,048,305 A | 4/2000 | Bauman et al. |
| 6,058,197 A | 5/2000 | Delage |
| 6,061,431 A | 5/2000 | Knappe et al. |
| 6,078,675 A | 6/2000 | Bowen-Nielsen et al. |
| 6,081,629 A | 6/2000 | Browning |
| 6,084,972 A | 7/2000 | van Halteren et al. |
| 6,088,339 A | 7/2000 | Meyer |
| 6,088,465 A | 7/2000 | Hanright et al. |
| 6,094,492 A | 7/2000 | Boesen |
| 6,095,820 A | 8/2000 | Luxon et al. |
| 6,104,822 A | 8/2000 | Melanson et al. |
| 6,104,913 A | 8/2000 | McAllister |
| 6,112,103 A | 8/2000 | Puthuff |
| 6,115,478 A | 9/2000 | Schneider |
| 6,118,877 A | 9/2000 | Lindemann et al. |
| 6,118,882 A | 9/2000 | Haynes |
| 6,122,500 A | 9/2000 | Dent et al. |
| 6,137,889 A | 10/2000 | Shennib et al. |
| 6,144,748 A | 11/2000 | Kerns |
| 6,149,605 A | 11/2000 | Christiansen |
| 6,151,645 A | 11/2000 | Young et al. |
| 6,157,727 A | 12/2000 | Rueda |
| 6,167,138 A | 12/2000 | Shennib |
| 6,181,801 B1 | 1/2001 | Puthuff et al. |
| 6,188,979 B1 | 2/2001 | Ashley |
| 6,198,971 B1 | 3/2001 | Leysieffer |
| 6,201,875 B1 | 3/2001 | Davis et al. |
| 6,205,190 B1 | 3/2001 | Antonio |
| 6,219,427 B1 | 4/2001 | Kates et al. |
| 6,229,900 B1 | 5/2001 | Leenen |
| 6,236,731 B1 | 5/2001 | Brennan et al. |
| 6,240,192 B1 | 5/2001 | Brennan et al. |
| 6,240,193 B1 | 5/2001 | Green |
| 6,240,194 B1 | 5/2001 | De Koning |
| 6,251,062 B1 | 6/2001 | Leysieffer |
| 6,265,102 B1 | 7/2001 | Shrim et al. |
| 6,308,222 B1 | 10/2001 | Krueger et al. |
| 6,317,613 B1 | 11/2001 | Brown, Jr. |
| 6,320,969 B1 | 11/2001 | Killion |
| 6,323,980 B1 | 11/2001 | Bloom |
| 6,324,907 B1 | 12/2001 | Halteren et al. |
| 6,330,233 B1 | 12/2001 | Miya et al. |
| 6,334,072 B1 | 12/2001 | Leysieffer |
| 6,336,863 B1 | 1/2002 | Baerlocher et al. |
| 6,347,148 B1 | 2/2002 | Brennan et al. |
| 6,351,472 B1 | 2/2002 | Meyer |
| 6,366,863 B1 | 4/2002 | Bye et al. |
| 6,366,880 B1 | 4/2002 | Ashley |
| 6,377,925 B1 | 4/2002 | Greene, Jr. et al. |
| 6,379,314 B1 | 4/2002 | Horn |
| 6,389,142 B1 | 5/2002 | Hagen et al. |
| 6,422,471 B2 | 7/2002 | Kowalski |
| 6,424,722 B1 * | 7/2002 | Hagen .................... H04R 25/70 381/314 |
| 6,438,245 B1 | 8/2002 | Taenzer et al. |
| 6,449,662 B1 | 9/2002 | Armitage |
| 6,453,051 B1 | 9/2002 | Killion |
| 6,466,678 B1 | 10/2002 | Killion et al. |
| 6,490,427 B2 | 12/2002 | Shields |
| 6,490,627 B1 | 12/2002 | Kalra et al. |
| 6,493,453 B1 | 12/2002 | Glendon |
| 6,545,989 B1 | 4/2003 | Butler |
| 6,554,762 B2 | 4/2003 | Leysieffer |
| 6,557,029 B2 * | 4/2003 | Szymansky .......... G06Q 10/107 705/37 |
| 6,565,503 B2 | 5/2003 | Leysieffer et al. |
| 6,574,342 B1 | 6/2003 | Davis et al. |
| 6,575,894 B2 | 6/2003 | Leysieffer et al. |
| 6,584,356 B2 | 6/2003 | Wassmund et al. |
| 6,590,986 B1 | 7/2003 | Fazio |
| 6,590,987 B2 | 7/2003 | Delage |
| 6,601,093 B1 * | 7/2003 | Peters ......................... 709/220 |
| 6,603,860 B1 | 8/2003 | Taenzer et al. |

(56) References Cited

U.S. PATENT DOCUMENTS

| | | |
|---|---|---|
| 6,606,391 B2 | 8/2003 | Brennan et al. |
| 6,644,120 B1 | 11/2003 | Braun et al. |
| 6,647,345 B2 | 11/2003 | Bye et al. |
| 6,654,652 B1 | 11/2003 | Dalton et al. |
| 6,658,307 B1 | 12/2003 | Mueller |
| 6,674,867 B2 | 1/2004 | Basseas |
| 6,684,063 B2 | 1/2004 | Berger et al. |
| 6,695,943 B2 | 2/2004 | Juneau et al. |
| 6,697,674 B2 | 2/2004 | Leysieffer |
| 6,704,424 B2 | 3/2004 | Killion |
| 6,707,581 B1 | 3/2004 | Browning |
| 6,717,925 B1 | 4/2004 | Leppisaari et al. |
| 6,738,485 B1 | 5/2004 | Boesen |
| 6,788,790 B1 | 9/2004 | Leysieffer |
| 6,792,114 B1 | 9/2004 | Kates et al. |
| 6,823,312 B2 | 11/2004 | Mittal et al. |
| 6,850,775 B1 | 2/2005 | Berg |
| 6,851,048 B2 | 2/2005 | Armitage et al. |
| 6,882,628 B2 | 4/2005 | Nakagawa et al. |
| 6,888,948 B2 | 5/2005 | Hagen et al. |
| 6,895,345 B2 | 5/2005 | Bye et al. |
| 6,913,578 B2 | 7/2005 | Hou |
| 6,944,474 B2 | 9/2005 | Rader et al. |
| 6,974,421 B1 | 12/2005 | Causevic et al. |
| 6,978,155 B2 | 12/2005 | Berg |
| 7,016,504 B1 | 3/2006 | Shennib |
| 7,054,957 B2 | 5/2006 | Armitage |
| 7,200,237 B2 | 4/2007 | Zhang et al. |
| 7,451,256 B2 | 11/2008 | Hagen et al. |
| 7,787,647 B2 | 8/2010 | Hagen et al. |
| 7,929,723 B2 | 4/2011 | Hagen et al. |
| 8,300,862 B2 | 10/2012 | Newton et al. |
| 8,503,703 B2 | 8/2013 | Eaton et al. |
| 2001/0003542 A1 | 6/2001 | Kita |
| 2001/0004397 A1 | 6/2001 | Kita et al. |
| 2001/0007050 A1 | 7/2001 | Adelman |
| 2001/0009019 A1 | 7/2001 | Armitage |
| 2001/0031996 A1 | 10/2001 | Leysieffer |
| 2001/0031999 A1 | 10/2001 | Carter et al. |
| 2001/0033664 A1 | 10/2001 | Poux et al. |
| 2001/0040873 A1 | 11/2001 | Nakagawa et al. |
| 2001/0041602 A1 | 11/2001 | Berger et al. |
| 2001/0044668 A1 | 11/2001 | Kimbrough et al. |
| 2001/0049466 A1 | 12/2001 | Leysieffer et al. |
| 2002/0012438 A1 | 1/2002 | Leysieffer et al. |
| 2002/0015506 A1 | 2/2002 | Aceti et al. |
| 2002/0026091 A1 | 2/2002 | Leysieffer |
| 2002/0029070 A1 | 3/2002 | Leysieffer et al. |
| 2002/0043545 A1 | 4/2002 | Tang |
| 2002/0048374 A1 | 4/2002 | Soli et al. |
| 2002/0076073 A1 | 6/2002 | Taenzer et al. |
| 2002/0083235 A1 | 6/2002 | Armitage |
| 2002/0094098 A1 | 7/2002 | Delage |
| 2002/0095292 A1 | 7/2002 | Mittal et al. |
| 2002/0111745 A1 | 8/2002 | Bye et al. |
| 2002/0150219 A1 | 10/2002 | Jorgenson et al. |
| 2002/0165466 A1 | 11/2002 | Givens et al. |
| 2002/0168075 A1 | 11/2002 | Hagen et al. |
| 2002/0183648 A1 | 12/2002 | Hou |
| 2003/0014566 A1 | 1/2003 | Armitage |
| 2003/0064746 A1 | 4/2003 | Rader et al. |
| 2003/0128859 A1 | 7/2003 | Greene et al. |
| 2003/0144603 A1 | 7/2003 | Zoth et al. |
| 2003/0162529 A1 | 8/2003 | Noblins |
| 2003/0181201 A1 | 9/2003 | Bomze et al. |
| 2004/0204921 A1 | 10/2004 | Bye |
| 2005/0008175 A1 | 1/2005 | Hagen et al. |
| 2005/0196002 A1 | 9/2005 | Hagen et al. |
| 2005/0283263 A1 | 12/2005 | Eaton et al. |
| 2006/0074572 A1 | 4/2006 | Bye et al. |
| 2008/0137888 A1 | 6/2008 | Newton et al. |
| 2010/0086153 A1 | 4/2010 | Hagen et al. |
| 2013/0308802 A1 | 11/2013 | Eaton et al. |

FOREIGN PATENT DOCUMENTS

| | | |
|---|---|---|
| DE | 19541648 A1 | 5/1997 |
| DE | 19600234 A1 | 7/1997 |
| DE | 29905172 U1 | 7/1999 |
| DE | 19815373 A1 | 10/1999 |
| DE | 19916900 C1 | 9/2000 |
| DE | 19949604 A1 | 5/2001 |
| DK | 1596633 T3 | 7/2012 |
| DK | 1901581 T3 | 2/2013 |
| EP | 0341902 A2 | 11/1989 |
| EP | 0341903 A2 | 11/1989 |
| EP | 0342782 A2 | 11/1989 |
| EP | 0363609 A1 | 4/1990 |
| EP | 0381608 A2 | 8/1990 |
| EP | 0448764 A1 | 10/1991 |
| EP | 0537026 A2 | 4/1993 |
| EP | 0565279 A2 | 10/1993 |
| EP | 0579152 A1 | 1/1994 |
| EP | 0448764 B1 | 6/1994 |
| EP | 0632609 A2 | 1/1995 |
| EP | 0658035 A2 | 6/1995 |
| EP | 0689755 A1 | 1/1996 |
| EP | 0726519 A1 | 8/1996 |
| EP | 0742548 A2 | 11/1996 |
| EP | 0763903 A1 | 3/1997 |
| EP | 0765042 A2 | 3/1997 |
| EP | 0789474 A2 | 8/1997 |
| EP | 0796035 A1 | 9/1997 |
| EP | 0800331 A2 | 10/1997 |
| EP | 0805562 A2 | 11/1997 |
| EP | 0823829 A2 | 2/1998 |
| EP | 0831674 A2 | 3/1998 |
| EP | 0853443 A2 | 7/1998 |
| EP | 0858180 A2 | 8/1998 |
| EP | 0873034 A2 | 10/1998 |
| EP | 0886389 A2 | 12/1998 |
| EP | 0895364 A1 | 2/1999 |
| EP | 0737351 B1 | 3/1999 |
| EP | 0903871 A2 | 3/1999 |
| EP | 0910191 A1 | 4/1999 |
| EP | 0936831 A1 | 8/1999 |
| EP | 0954146 A2 | 11/1999 |
| EP | 0964603 A1 | 12/1999 |
| EP | 0876717 B1 | 4/2000 |
| EP | 1191817 A1 | 3/2002 |
| EP | 0878928 B1 | 8/2002 |
| EP | 1596633 A2 | 11/2005 |
| EP | 1596633 B1 | 7/2012 |
| EP | 1901581 B1 | 2/2013 |
| GB | 1252799 A | 11/1971 |
| GB | 1596633 A | 8/1981 |
| JP | 1318500 A | 12/1989 |
| JP | 10210541 | 8/1998 |
| JP | 11055219 | 2/1999 |
| JP | 11133998 | 5/1999 |
| JP | 11196065 | 7/1999 |
| JP | 2000287299 | 10/2000 |
| WO | WO-8404195 A1 | 10/1984 |
| WO | WO-8601671 A1 | 3/1986 |
| WO | WO-8701851 A1 | 3/1987 |
| WO | WO-9103042 A1 | 3/1991 |
| WO | WO-9422372 A1 | 3/1994 |
| WO | WO-9425958 A1 | 11/1994 |
| WO | WO-9513685 A2 | 5/1995 |
| WO | WO-9515712 A1 | 6/1995 |
| WO | WO-9602097 A1 | 1/1996 |
| WO | WO-9626580 A1 | 8/1996 |
| WO | WO-9637086 A1 | 11/1996 |
| WO | WO-9641498 A1 | 12/1996 |
| WO | WO-9714266 A1 | 4/1997 |
| WO | WO-9714267 A1 | 4/1997 |
| WO | WO-9717819 A1 | 5/1997 |
| WO | WO-9719573 A1 | 5/1997 |
| WO | WO-9723062 A1 | 6/1997 |
| WO | WO-9727682 A1 | 6/1997 |
| WO | WO-9727712 A1 | 7/1997 |
| WO | WO-9731431 A1 | 8/1997 |
| WO | WO-9739537 A1 | 10/1997 |

(56) References Cited

FOREIGN PATENT DOCUMENTS

| WO | WO-9741653 A1 | 11/1997 |
|---|---|---|
| WO | WO-9802969 A2 | 1/1998 |
| WO | WO-9816086 A1 | 4/1998 |
| WO | WO-9826513 A1 | 6/1998 |
| WO | WO-9841030 A2 | 9/1998 |
| WO | WO-9844648 A1 | 10/1998 |
| WO | WO-9844667 A2 | 10/1998 |
| WO | WO-9844760 A2 | 10/1998 |
| WO | WO-9844762 A1 | 10/1998 |
| WO | WO-9847313 A2 | 10/1998 |
| WO | WO-9847314 A2 | 10/1998 |
| WO | WO-9849785 A1 | 11/1998 |
| WO | WO-9851124 A1 | 11/1998 |
| WO | WO-9854928 A2 | 12/1998 |
| WO | WO-9855833 A1 | 12/1998 |
| WO | WO-9856106 A2 | 12/1998 |
| WO | WO-9901994 A2 | 1/1999 |
| WO | WO-9904043 A1 | 1/1999 |
| WO | WO-9907302 A1 | 2/1999 |
| WO | WO-9908457 A2 | 2/1999 |
| WO | WO-9919779 A1 | 4/1999 |
| WO | WO-9922550 A1 | 5/1999 |
| WO | WO-9926392 A1 | 5/1999 |
| WO | WO-9931935 A1 | 6/1999 |
| WO | WO-9931937 A1 | 6/1999 |
| WO | WO-9943105 A1 | 8/1999 |
| WO | WO-9943185 A1 | 8/1999 |
| WO | WO-9946912 A1 | 9/1999 |
| WO | WO-9948330 A1 | 9/1999 |
| WO | WO-9951057 A1 | 10/1999 |
| WO | WO-9957657 A1 | 11/1999 |
| WO | WO-0002418 A1 | 1/2000 |
| WO | WO-0010363 A1 | 2/2000 |
| WO | WO-0016590 A1 | 3/2000 |
| WO | WO-0019632 A1 | 4/2000 |
| WO | WO-0021332 A2 | 4/2000 |
| WO | WO-0022874 A2 | 4/2000 |
| WO | WO-0036687 A1 | 6/2000 |
| WO | WO-0036690 A2 | 6/2000 |
| WO | WO-0036691 A1 | 6/2000 |
| WO | WO-0036692 A1 | 6/2000 |
| WO | WO-0128195 A1 | 4/2001 |
| WO | WO-0135695 A2 | 5/2001 |
| WO | WO-0139370 A2 | 5/2001 |
| WO | WO-0145088 A1 | 6/2001 |
| WO | WO-0151122 A1 | 7/2001 |
| WO | WO-0154456 A1 | 7/2001 |
| WO | WO-0154458 A2 | 7/2001 |
| WO | WO-0169830 A2 | 9/2001 |
| WO | WO-0176321 A1 | 10/2001 |
| WO | WO-0193627 A2 | 12/2001 |
| WO | WO-0197564 A2 | 12/2001 |
| WO | WO-0209363 A2 | 1/2002 |
| WO | WO-0209473 A2 | 1/2002 |
| WO | WO-0230157 A2 | 4/2002 |
| WO | WO-03063546 A1 | 7/2003 |

OTHER PUBLICATIONS

"U.S. Appl. No. 08/896,484, Non Final Office Action mailed Aug. 30, 2000", 16 pgs.
"U.S. Appl. No. 08/896,484, Notice of Allowance mailed Mar. 26, 2002", 4 pgs.
"U.S. Appl. No. 08/896,484, Response filed Feb. 10, 2000 to Non Final Office Action mailed Aug. 10, 1999", 3 pgs.
"U.S. Appl. No. 08/896,484, Response filed Feb. 11, 2002 to Advisory Action mailed Jan. 29, 2002", 6 pgs.
"U.S. Appl. No. 08/896,484, Response filed Jun. 28, 2001 to Non Final Office Action mailed Feb. 28, 2001", 13 pgs.
"U.S. Appl. No. 08/896,484, Response filed Aug. 3, 2000 to Final Office Action mailed May 9, 2000", 3 pgs.
"U.S. Appl. No. 08/896,484, Response filed Nov. 8, 2001 to Final Office Action mailed Sep. 10, 2001", 12 pgs.
"U.S. Appl. No. 08/896,484, Response filed Nov. 30, 2000 to Non Final Office Action mailed Aug. 30, 2000", 4 pgs.
"U.S. Appl. No. 09/004,788, Examiner Interview Summary mailed Oct. 17, 2000", 1 pg.
"U.S. Appl. No. 09/004,788, Final Office Action mailed Mar. 31, 2000", 5 pgs.
"U.S. Appl. No. 09/004,788, Non Final Office Action mailed Mar. 23, 2001", 8 pgs.
"U.S. Appl. No. 09/004,788, Non Final Office Action mailed Jul. 16, 1999", 10 pgs.
"U.S. Appl. No. 09/004,788, Notice of Allowance mailed Oct. 2, 2001", 7 pgs.
"U.S. Appl. No. 09/004,788, Preliminary Amendment mailed Sep. 29, 2000", 6 pgs.
"U.S. Appl. No. 09/004,788, Response filed Jun. 25, 2001 to Non Final Office Action mailed Mar. 23, 2001", 7 pgs.
"U.S. Appl. No. 09/492,913, Appeal Brief filed Apr. 2, 2007", 38 pgs.
"U.S. Appl. No. 09/492,913, Appeal Brief filed Apr. 14, 2008", 35 pgs.
"U.S. Appl. No. 09/492,913, Examiners Answer to Appeal Brief mailed Aug. 5, 2008", 32 pgs.
"U.S. Appl. No. 09/492,913, Examiners Answer to Appeal Brief mailed Aug. 19, 2010", 11 pgs.
"U.S. Appl. No. 09/492,913, Final Office Action mailed Apr. 20, 2005", 21 pgs.
"U.S. Appl. No. 09/492,913, Final Office Action mailed Jun. 2, 2006", 24 pgs.
"U.S. Appl. No. 09/492,913, Non-Final Office Action mailed Jun. 2, 2004", 15 pgs.
"U.S. Appl. No. 09/492,913, Non-Final Office Action mailed Jul. 13, 2007", 20 pgs.
"U.S. Appl. No. 09/492,913, Non-Final Office Action mailed Oct. 26, 2005", 21 pgs.
"U.S. Appl. No. 09/492,913, Preliminary Amendment filed Jan. 20, 2000", 1 pg.
"U.S. Appl. No. 09/492,913, Request for Rehearing filed Oct. 19, 2010", 11 pgs.
"U.S. Appl. No. 09/492,913, Response filed Feb. 27, 2006 to Non-Final Office Action mailed Oct. 26, 2005", 26 pgs.
"U.S. Appl. No. 09/492,913, Response filed Mar. 2, 2004 to Restriction Requirement mailed Feb. 2, 2004", 1 pg.
"U.S. Appl. No. 09/492,913, Response filed Nov. 2, 2004 to Non-Final Office Action mailed Jun. 2, 2004", 24 pgs.
"U.S. Appl. No. 09/492,913, Response to Notification of Non-Compliant Appeal Brief filed May 19, 2008", 2 pgs.
"U.S. Appl. No. 09/492,913, Restriction Requirement mailed Feb. 2, 2004", 4 pgs.
"U.S. Appl. No. 09/795,829, 312 Amendment filed Feb. 21, 2006", 9 pgs.
"U.S. Appl. No. 09/795,829, Preliminary Amendment filed Feb. 28, 2001", 4 pgs.
"U.S. Appl. No. 09/795,829, PTO Response to 312 Amendment mailed Apr. 10, 2006", 2 pgs.
"U.S. Appl. No. 10/096,335, Comments on Statement of Reasons for Allowance filed Dec. 30, 2004", 1 pg.
"U.S. Appl. No. 10/096,335, Final Office Action mailed Jul. 15, 2003", 12 pgs.
"U.S. Appl. No. 10/096,335, Non Final Office Action mailed Feb. 11, 2004", 7 pgs.
"U.S. Appl. No. 10/096,335, Non Final Office Action mailed Oct. 3, 2002", 14 pgs.
"U.S. Appl. No. 10/096,335, Notice of Allowance mailed Nov. 18, 2004", 16 pgs.
"U.S. Appl. No. 10/096,335, Preliminary Amendment mailed Mar. 11, 2002", 1 pg.
"U.S. Appl. No. 10/096,335, Response filed Jan. 14, 2004 to Final Office Action mailed Jul. 15, 2003", 14 pgs.
"U.S. Appl. No. 10/096,335, Response filed Apr. 3, 2003 to Non Final Office Action mailed Oct. 3, 2002", 14 pgs.
"U.S. Appl. No. 10/096,335, Response filed Jun. 10, 2004 to Non Final Office Action mailed Feb. 11, 2004", 11 pgs.
"U.S. Appl. No. 10/096,335, Supplemental Notice of Allowability mailed Dec. 27, 2004", 3 pgs.
"U.S. Appl. No. 10/112,965, Advisory Action mailed Apr. 17, 2003", 2 pgs.

(56) References Cited

OTHER PUBLICATIONS

"U.S. Appl. No. 10/112,965, Final Office Action mailed Jan. 27, 2003", 11 pgs.
"U.S. Appl. No. 10/112,965, Non Final Office Action mailed Sep. 23, 2002", 11 pgs.
"U.S. Appl. No. 10/112,965, Notice of Allowance mailed Jun. 6, 2003", 5 pgs.
"U.S. Appl. No. 10/112,965, Response filed Mar. 27, 2003 to Final Office Action mailed Jan. 27, 2003", 7 pgs.
"U.S. Appl. No. 10/112,965, Response filed Nov. 19, 2002 to Non Final Office Action mailed Sep. 23, 2002", 6 pgs.
"U.S. Appl. No. 10/241,764, Preliminary Amendment filed Sep. 10, 2002", 2 pgs.
"U.S. Appl. No. 10/698,333, Preliminary Amendment filed Jun. 3, 2004", 6 pgs.
"U.S. Appl. No. 10/698,333, Supplemental Notice of Allowability mailed Feb. 11, 2005", 2 pgs.
"U.S. Appl. No. 10/698,333, Supplemental Notice of Allowability mailed Mar. 1, 2005", 2 pgs.
"U.S. Appl. No. 10/698,333, Supplemental Preliminary Amendment filed Jun. 22, 2004", 6 pgs.
"U.S. Appl. No. 10/842,246, 312 Amendment filed Nov. 30, 2009", 5 pgs.
"U.S. Appl. No. 10/842,246, Advisory Action mailed Jul. 20, 2009", 3 pgs.
"U.S. Appl. No. 10/842,246, Ex Parte Quayle Action mailed Apr. 3, 2009", 9 pgs.
"U.S. Appl. No. 10/842,246, Examiner Interview Summary filed Sep. 9, 2009", 1 pg.
"U.S. Appl. No. 10/842,246, Examiner Interview Summary mailed Jun. 30, 2009", 2 pgs.
"U.S. Appl. No. 10/842,246, Non-Final Office Action mailed Nov. 6, 2008", 13 pgs.
"U.S. Appl. No. 10/842,246, Notice of Allowance mailed Mar. 24, 2010", 7 pgs.
"U.S. Appl. No. 10/842,246, Notice of Allowance mailed Oct. 1, 2009", 8 pgs.
"U.S. Appl. No. 10/842,246, Notice of Allowance mailed Nov. 12, 2009", 9 pgs.
"U.S. Appl. No. 10/842,246, Response filed Mar. 6, 2009 to Non-Final Office Action mailed Nov. 6, 2008", 7 pgs.
"U.S. Appl. No. 10/842,246, Response filed Aug. 4, 2008 to Restriction Requirement mailed Jul. 2, 2008", 8 pgs.
"U.S. Appl. No. 10/842,246, Response filed Jun. 10, 2009 to Ex parte Quayle Office Action mailed Apr. 3, 2009", 6 pgs.
"U.S. Appl. No. 10/842,246, Restriction Requirement mailed Jul. 2, 2008", 7 pgs.
"U.S. Appl. No. 10/842,246, Supplemental Notice of Allowability mailed Oct. 15, 2009", 3 pgs.
"U.S. Appl. No. 10/842,346, PTO Response to 312 Amendment mailed Feb. 1, 2010", 2 pgs.
"U.S. Appl. No. 11/036,197, Advisory Action mailed Mar. 18, 2008", 3 pgs.
"U.S. Appl. No. 11/036,197, Advisory Action mailed Apr. 3, 2007", 3 pgs.
"U.S. Appl. No. 11/036,197, Final Office Action mailed Jan. 23, 2007", 13 pgs.
"U.S. Appl. No. 11/036,197, Non Final Office Action mailed Jun. 4, 2007", 11 pgs.
"U.S. Appl. No. 11/036,197, Non Final Office Action mailed Aug. 15, 2006", 24 pgs.
"U.S. Appl. No. 11/036,197, Notice of Allowance mailed Jul. 1, 2008", 6 pgs.
"U.S. Appl. No. 11/036,197, Preliminary Amendment mailed May 23, 2005", 5 pgs.
"U.S. Appl. No. 11/036,197, Response filed Mar. 23, 2007 to Final Office Action mailed Jan. 23, 2007", 10 pgs.
"U.S. Appl. No. 11/036,197, Response filed Oct. 4, 2007 to Non-Final Office Action mailed Jun. 4, 2007", 8 pgs.
"U.S. Appl. No. 11/036,197, Response filed Nov. 15, 2006 to Non Final Office Action mailed Aug. 15, 2006", 9 pgs.
"U.S. Appl. No. 11/036,197, Supplemental Preliminary Amendment filed Jul. 13, 2005", 5 pgs.
"U.S. Appl. No. 11/087,081, Examiner Interview Summary mailed Oct. 26, 2006", 3 pgs.
"U.S. Appl. No. 11/212,406, Examiner Interview Summary Feb. 1, 2011", 3 pgs.
"U.S. Appl. No. 11/212,406, Examiner Interview Summary mailed Apr. 24, 2013", 3 pgs.
"U.S. Appl. No. 11/212,406, Examiner Interview Summary mailed Jun. 29, 2010", 2 pgs.
"U.S. Appl. No. 11/212,406, Final Office Action mailed Feb. 8, 2010", 27 pgs.
"U.S. Appl. No. 11/212,406, Final Office Action mailed Mar. 8, 2011", 23 pgs.
"U.S. Appl. No. 11/212,406, Final Office Action mailed May 18, 2007", 14 pgs.
"U.S. Appl. No. 11/212,406, Final Office Action mailed Sep. 17, 2008", 24 pgs.
"U.S. Appl. No. 11/212,406, Non Final Office Action mailed Aug. 14, 2012", 33 pgs.
"U.S. Appl. No. 11/212,406, Non Final Office Action mailed Sep. 19, 2006", 13 pgs.
"U.S. Appl. No. 11/212,406, Non-Final Office Action mailed Feb. 4, 2008", 15 pgs.
"U.S. Appl. No. 11/212,406, Non-Final Office Action mailed Jul. 19, 2010", 20 pgs.
"U.S. Appl. No. 11/212,406, Non-Final Office Action mailed Sep. 4, 2009", 23 pgs.
"U.S. Appl. No. 11/212,406, Notice of Allowance mailed May 24, 2013", 6 pgs.
"U.S. Appl. No. 11/212,406, Response filed Feb. 14, 2013 to Non Final Office Action mailed Aug. 14, 2012", 29 pgs.
"U.S. Appl. No. 11/212,406, Response filed Feb. 19, 2007 to Non Final Office Action mailed Sep. 19, 2006", 15 pgs.
"U.S. Appl. No. 11/212,406, Response filed May 9, 2013 to Non Final Office Action mailed Aug. 14, 2012", 13 pgs.
"U.S. Appl. No. 11/212,406, Response filed Jun. 4, 2008 to Non Final Office Action mailed Feb. 4, 2008", 13 pgs.
"U.S. Appl. No. 11/212,406, Response filed Jun. 17, 2009 to Final Office Action mailed Sep. 17, 2008", 15 pgs.
"U.S. Appl. No. 11/212,406, Response filed Sep. 7, 2011 to Final Office Action mailed Mar. 8, 2011", 15 pgs.
"U.S. Appl. No. 11/212,406, Response filed Oct. 31, 2007 to Final Office Action mailed May 18, 2007", 14 pgs.
"U.S. Appl. No. 11/212,406, Response filed Dec. 4, 2009 to Non Final Office Action mailed Sep. 4, 2009", 16 pgs.
"U.S. Appl. No. 11/212,406, Response filed Dec. 20, 2010 to Non Final Office Action mailed Jul. 19, 2010", 13 pgs.
"U.S. Appl. No. 11/331,827, Preliminary Amendment filed Jan. 13, 2006", 3 pgs.
"U.S. Appl. No. 11/857,283, Final Office Action mailed Mar. 18, 2011", 16 pgs.
"U.S. Appl. No. 11/857,283, Final Office Action mailed May 12, 2010", 13 pgs.
"U.S. Appl. No. 11/857,283, Final Office Action mailed Aug. 31, 2011", 18 pgs.
"U.S. Appl. No. 11/857,283, Non Final Office Action mailed Jan. 11, 2012", 16 pgs.
"U.S. Appl. No. 11/857,283, Non-Final Office Action mailed Sep. 24, 2010", 11 pgs.
"U.S. Appl. No. 11/857,283, Non-Final Office Action mailed Oct. 8, 2009", 14 pgs.
"U.S. Appl. No. 11/857,283, Notice of Allowance mailed Jun. 22, 2012", 8 pgs.
"U.S. Appl. No. 11/857,283, Response filed Feb. 8, 2010 to Non Final Office Action mailed Oct. 8, 2009", 12 pgs.
"U.S. Appl. No. 11/857,283, Response filed Apr. 11, 2012 to Non Final Office Action mailed Jan. 11, 2012", 10 pgs.
"U.S. Appl. No. 11/857,283, Response filed Jun. 20, 2011 to Final Office Action mailed Mar. 18, 2011", 10 pgs.

(56) References Cited

OTHER PUBLICATIONS

"U.S. Appl. No. 11/857,283, Response filed Sep. 13, 2010 to Final Office Action mailed May 12, 2010", 8 pgs.
"U.S. Appl. No. 11/857,283, Response filed Nov. 30, 2011 to Final Office Action mailed Aug. 31, 2011", 10 pgs.
"U.S. Appl. No. 11/857,283, Response filed Dec. 23, 2010 to Non Final Office Action mailed Sep. 24, 2010", 9 pgs.
"U.S. Appl. No. 12/553,857, Non-Final Office Action mailed Sep. 29, 2010", 6 pgs.
"U.S. Appl. No. 12/553,857, Notice of Allowance mailed Dec. 13, 2010", 7 pgs.
"U.S. Appl. No. 12/553,857, Preliminary Amendment filed Dec. 18, 2009", 5 pgs.
"U.S. Appl. No. 12/553,857, Response filed Nov. 11, 2010 to Non Final Office Action mailed Sep. 29, 2010", 6 pgs.
"U.S. Appl. No. 12/553,857, Supplemental Notice of Allowability mailed Feb. 7, 2011", 4 pgs.
"Australian Application Serial No. 2007216810, First Examiner Report mailed May 27, 2010", 2 pgs.
"Australian Application Serial No. 2007216810, First Examiner Report Response filed Mar. 30, 2011", 3 pgs.
"Canadian Application Serial No. 2,223,660, Office Action mailed Feb. 1, 2005", 3 pgs.
"Canadian Application Serial No. 2,223,660, Office Action mailed May 5, 2008", 5 pgs.
"Canadian Application Serial No. 2,223,660, Response to Office Actions mailed May 5, 2008", 17 pgs.
"Canadian Application Serial No. 2,343,986, Office Action mailed May 9, 2007", 2 pgs.
"Canadian Application Serial No. 2,343,986, Office Action Mailed Dec. 12, 2008", 2 pgs.
"Canadian Application Serial No. 2,396,771, Office Action mailed Mar. 14, 2007", 7 pgs.
"Canadian Application Serial No. 2,396,771, Office Action mailed Oct. 27, 2008", 5 pgs.
"Canadian Application Serial No. 2,396,771, Response filed Aug. 27, 2007 to Office Action mailed Mar. 14, 2007", 14 pgs.
"Canadian Application Serial No. 2,506,957, Office Action mailed Apr. 14, 2008", 3 pgs.
"Canadian Application Serial No. 2,506,957, Response filed Oct. 14, 2008 to Office Action mailed Apr. 14, 2008", 8 pgs.
"Canadian Application Serial No. 2,601,662, Office Action mailed Apr. 20, 2011", 4 pgs.
"Canadian Application Serial No. 2,601,662, Office Action mailed Sep. 11, 2012", 5 pgs.
"Canadian Application Serial No. 2,601,662, Response filed Aug. 29, 2011 to Office Action mailed Apr. 20, 2011", 13 pgs.
"Canadian Application Serial No. 2601662, Office Action Mailed Feb. 8, 2010", 5 pgs.
"Canadian Application Serial No. 2601662, Office Action Response Filed Aug. 17, 2010", 9 pgs.
"Chinese Application Serial No. 200710186183.0, Office Action mailed Feb. 24, 2011", w/English Translation, 18 pgs.
"Chinese Application Serial No. 200710186183.0, Office Action mailed Mar. 19, 2012", w/English Translation, 20 pgs.
"Chinese Application Serial No. 200710186183.0, Office Action mailed Sep. 5, 2012", w/English Translation, 22 pgs.
"Chinese Application Serial No. 2007101861830, Response filed Aug. 3, 2012 to Office Action mailed Mar. 19, 2012", 8 pgs.
"European Application Serial No. 01942849.9, Notice of Opposition filed Jul. 5, 2012", 31 pgs.
"European Application Serial No. 01942849.9, Office Action mailed Jan. 15, 2004", 6 pgs.
"European Application Serial No. 01942849.9, Office Action mailed Aug. 30, 2004", 1 pg.
"European Application Serial No. 01942849.9, Response filed Feb. 25, 2013 to Notice of Opposition mailed Jul. 5, 2012", 18 pgs.
"European Application Serial No. 01942849.9, Response filed Nov. 11, 2004 to Office Action mailed Aug. 8, 2004", 20 pgs.
"European Application Serial No. 01942849.9, Summons to Attend Oral Proceeding mailed Dec. 15, 2010", 5 Pgs.
"European Application Serial No. 05252864.3, European Office Action mailed May 18, 2011", 5 pgs.
"European Application Serial No. 05252864.3, European Office Action Response Filed Sep. 5, 2011", 2 pages.
"European Application Serial No. 05252864.3, Office Action mailed Apr. 29, 2009", 4 pgs.
"European Application Serial No. 05252864.3, Office Action mailed Oct. 13, 2008", 4 pgs.
"European Application Serial No. 05252864.3, Response filed Jul. 30, 2009 to Office Action mailed Apr. 29, 2009", 3 pgs.
"European Application Serial No. 07253666.7, European Search Report mailed Oct. 10, 2008", 7 pgs.
"European Application Serial No. 07253666.7, Office Action Mailed Mar. 27, 2009", 1 pg.
"European Application Serial No. 07253666.7, Office Action mailed Nov. 26, 2010", 8 pgs.
"European Application Serial No. 07253666.7, response filed Mar. 29, 2011 to Office Action mailed Nov. 26, 2010", 21 pgs.
"European Application Serial No. 07253666.7, Response filed Sep. 30, 2009 to Office Action mailed Mar. 27, 2009", 14 pgs.
"European Application Serial No. 07253666.7, Response filed Nov. 15, 2007 to Office Action mailed Nov. 7, 2007", 10 pgs.
"European Application Serial No. 97403015.7, European Search Report mailed Sep. 19, 2001", 3 pgs.
"European Application Serial No. 97403015.7, Office Action mailed May 29, 2007", 5 pgs.
"European Application Serial No. 97403015.7, Office Action mailed Jul. 30, 2010", 4 Pgs.
"European Application Serial No. 97403015.7, Response to Office Action mailed May 29, 2007", 8 pgs.
"European Application Serial No. 9951457.3, Response to Office Action mailed Jul. 14, 2004", 1 pgs.
"European Application Serial No. 9951457.3. Response to Office Action mailed Nov. 16, 2005", 21 pgs.
"European Application Serial No. 99951457.3, European Office Action mailed Jul. 14, 2004", 1 pgs.
"European Application Serial No. 99951457.3, European Search Report mailed Jul. 12, 2004", 3 pgs.
"European Application Serial No. 99951457.3, Office Action mailed Sep. 12, 2007", 4 pgs.
"European Application Serial No. 99951457.3, Office Action mailed Nov. 16, 2005", 10 pgs.
"European Application Serial No. 99951457.3, Response to Office Action mailed Mar. 4, 2008", 2 pgs.
"HI-PRO Hearing Instrument Programmer", GN Otometrics A/S, (Dec. 2000), 12 pgs.
"International Application Serial No. PCT/US01/01663, International Preliminary Examination Report mailed Jul. 18, 2002", 8 pgs.
"International Application Serial No. PCT/US01/01663, International Search Report mailed Nov. 19, 2001", 5 pgs.
"International Application Serial No. PCT/US01/01663, Written Opinion mailed May 3, 2002", 9 pgs.
"International Application Serial No. PCT/US99/21188, International Preliminary Examination Report mailed Mar. 27, 2001", 5 pgs.
"International Application Serial No. PCT/US99/21188, International Search Report mailed Dec. 13, 2001", 2 pgs.
"International Application Serial No. PCT/US99/21188, Written Opinion mailed Dec. 15, 2000", 8 pgs.
"Microcard PCMCIA Programming Interface", [Online]. [Archived Oct. 17, 2002]. Retrieved from the Internet: <URL: www.hearing-aid.com/microcard.htm>, (Jun. 22, 2004), 2 pgs.
"Module: Definition from Answers.com", Computer Desktop Encyclopedia. TechEncyclopedia. Computer Language Company, Inc, [Online]. Retrieved from the Internet: <URL: http://www.answers.com/topic/module>, 9 pgs.
"Personal Programmer 2000: A Personal Programmer that's practically a PC in your hand!", [Online]. Retrieved from the Internet: <URL: http://www.siemens-hearing.com/products/pprods/persprogmain.html>, (Jun. 24, 1999), 3 pgs.

(56) References Cited

OTHER PUBLICATIONS

"Welcome Page", Micro Audiometrics Corp., [Online]. Retrieved from the Internet: <URL: http://www.microaud.com>, (May 26, 1999), 17 pgs.
"What is PCMCIA", [Online]. Retrieved from the Internet: <URL: http://pw2.netcom.com/~ed13/pcmcia.html>, (Nov. 14, 1996).
Anderson, Blane A., "A PCMCIA Card for Programmable Instrument Applications", TECH-TOPIC, reprinted from the Hearing Review, vol. 4, No. 9, (Sep. 1997), 47-48.
Armitage, Scott, et al., "Microcard: A new hearing aid programming interface", Hearing Journal, 51(9), (Sep. 1998), 37-32.
Clancy, David A, "Highlighting developments in hearing aids", Hearing Instruments, (Dec. 1995), 2.
Davis, Leroy, "Interface Between Data Terminal Equipment and Data Circuit Terminating Equipment Employing Serial Binary Data Interchange", EIA-232 Bus, [Online]. Retrieved from the Internet: <URL: www.interfacebus.com/Design_Connector_RS232.html>, (Jul. 2, 2006), 1-6.
Eaton, Anthony M, et al., "Hearing Aid Systems", U.S. Appl. No. 09/492,913, filed Jan. 20, 2000, 56 pgs.
Griffing, Terry S, et al., "Acoustical Efficiency of Canal ITE Aids", Audecibel, (Spring 1983), 30-31.
Griffing, Terry S, et al., "Custom canal and mini in-the-ear hearing aids", Hearing Instruments, vol. 34, No. 2, (Feb. 1983), 31-32.
Griffing, Terry S, et al., "How to evaluate, sell, fit and modify canal aids", Hearing Instruments, vol. 35, No. 2, (Feb. 1984), 3 pgs.
Ingrao, B., "Audiology Unplugged: Leading hearing care into the Bluetooth Age", Hearing Review, (Jan. 2006), 6 pgs.
Mahon, William J, "Hearing Aids Get a Presidential Endorsement", The Hearing Journal (Oct. 1983), 7-8.
Micro Audiometrics Corporation, "Micro Audiometrics Corporation Web Page", http://www/microaud.com, Internet webpage, (May 26, 1999), 11 pgs.
Ristola, Jorma, "Mobility in Internet", S-38.130 Licentiate Course on Telecommunications Technology, vol. S-38130, [Online] Retrieved From Internet: <:http://www.netlab.tkk.fi/opetus/s38130/s96/papers/mobi.pdf>, (Oct. 22, 1996), 1-10.
Sullivan, Roy F, "Custom canal and concha hearing instruments: A real ear comparison Part I", Hearing Instruments, vol. 40, No. 4, (Jul. 1989), 23-29.
Sullivan, Roy F, "Custom canal and concha hearing instruments: A real ear comparison Part II", Hearing Instruments, vol. 40, No. 7, (Jul. 1989), 30-36.
"U.S. Appl. No. 09/152,416, Final Office Action mailed Apr. 23, 2001", 7 pgs.
"U.S. Appl. No. 09/152,416, Non Final Office Action mailed May 2, 2000", 6 pgs.
"U.S. Appl. No. 09/152,416, Non Final Office Action mailed Nov. 3, 2000", 7 pgs.
"U.S. Appl. No. 09/152,416, Notice of Allowance mailed Apr. 8, 2002", 4 pgs.
"U.S. Appl. No. 09/152,416, Notice of Allowance mailed Oct. 19, 2001", 4 pgs.
"U.S. Appl. No. 09/152,416, Response filed Feb. 5, 2001 to Non Final Office Action mailed Nov. 3, 2000", 5 pgs.
"U.S. Appl. No. 09/152,416, Response filed Sep. 24, 2001 to Final Office Action mailed Apr. 23, 2001", 2 pgs.
"U.S. Appl. No. 09/152,416, Response filed Oct. 2, 2000 to Non Final Office Action mailed May 2, 2000", 7 pgs.
"U.S. Appl. No. 09/795,829, Final Office Action mailed Aug. 9, 2002", 7 pgs.
"U.S. Appl. No. 09/795,829, Non Final Office Action mailed Jun. 11, 2003", 12 pgs.
"U.S. Appl. No. 09/795,829, Non Final Office Action mailed Jun. 28, 2001", 9 pgs.
"U.S. Appl. No. 09/795,829, Non Final Office Action mailed Dec. 11, 2001", 9 pgs.
"U.S. Appl. No. 09/795,829, Non Final Office Action mailed Dec. 23, 2002", 10 pgs.
"U.S. Appl. No. 09/795,829, Notice of Allowance mailed Jan. 21, 2004", 8 pgs.
"U.S. Appl. No. 09/795,829, Notice of Allowance mailed Jun. 24, 2004", 5 pgs.
"U.S. Appl. No. 09/795,829, Notice of Allowance mailed Nov. 14, 2003", 6 pgs.
"U.S. Appl. No. 09/795,829, Notice of Allowance mailed Nov. 21, 2005", 8 pgs.
"U.S. Appl. No. 09/795,829, Response filed Mar. 24, 2003 to Non Final Office Action mailed Dec. 23, 2002", 15 pgs.
"U.S. Appl. No. 09/795,829, Response filed Jun. 11, 2002 to Non Final Office Action mailed Dec. 11, 2001", 10 pgs.
"U.S. Appl. No. 09/795,829, Response filed Sep. 28, 2001 to Non Final Office Action mailed Jun. 28, 2001", 6 pgs.
"U.S. Appl. No. 09/795,829, Response filed Oct. 14, 2003 to Non Final Office Action mailed Jun. 11, 2003", 14 pgs.
"U.S. Appl. No. 09/795,829, Response filed Nov. 12, 2002 to Final Office Action mailed Aug. 9, 2002", 5 pgs.
"U.S. Appl. No. 10/241,764, Final Office Action mailed Jun. 11, 2003", 9 pgs.
"U.S. Appl. No. 10/241,764, Non Final Office Action mailed Jan. 8, 2004", 9 pgs.
"U.S. Appl. No. 10/241,764, Non Final Office Action mailed Jan. 15, 2003", 12 pgs.
"U.S. Appl. No. 10/241,764, Notice of Allowance mailed Sep. 29, 2004", 16 pgs.
"U.S. Appl. No. 10/241,764, Response filed Apr. 14, 2003 to Non Final Office Action mailed Jan. 15, 2003", 13 pgs.
"U.S. Appl. No. 10/241,764, Response filed Jun. 8, 2004 to Non Final Office Action mailed Jan. 8, 2004", 11 pgs.
"U.S. Appl. No. 10/241,764, Response filed Sep. 11, 2003 to Final Office Action mailed Jun. 11, 2003", 5 pgs.
"U.S. Appl. No. 10/698,333, Non Final Office Action mailed Aug. 3, 2004", 12 pgs.
"U.S. Appl. No. 10/698,333, Notice of Allowance mailed Dec. 8, 2004", 7 pgs.
"U.S. Appl. No. 10/698,333, Response filed Nov. 3, 2004 to Non Final Office Action mailed Aug. 3, 2004", 9 pgs.
"U.S. Appl. No. 11/036,197, Final Office Action mailed Jan. 2, 2008", 13 pgs.
"U.S. Appl. No. 11/036,197, Response filed Mar. 3, 2008 to Final Office Action mailed Jan. 2, 2008", 8 pgs.
"U.S. Appl. No. 11/087,081, Non Final Office Action mailed Mar. 15, 2006", 6 pgs.
"U.S. Appl. No. 13/953,579, Preliminary Amendment filed Jul. 30, 2013", 8 pgs.
"Canadian Application Serial No. 2,601,662, Response filed Mar. 11, 2013 to Office Action mailed Sep. 11, 2012", 5 pgs.
"Chinese Application Serial No. 200710186183.0, Response filed Jul. 8, 2011 to Office Action mailed Feb. 24, 2011", w/English Claims, 27 pgs.
"European Application Serial No. 01942849.9, Opposition Response filed Nov. 26, 2013 to Summons to Attend Oral Proceedings mailed Jul. 12, 2013", 33 pgs.
"European Application Serial No. 01942849.9, Response filed Nov. 8, 2013 to Summons to Attend Oral Proceedings mailed Jul. 12, 2013", 102 pgs.
"European Application Serial No. 01942849.9, Summons to Attend Oral Proceedings mailed Jul. 12, 2013", 20 pgs.
"Korean Application Serial No. 10-2007-94950, Office Action mailed Aug. 9, 2013", 5 pgs.
"Korean Application Serial No. 10-2007-94950, Preliminary Amendment filed Dec. 4, 2007", 15 pgs.
"Wireless Application Protocol: Wireless Application Environment Overview", WAP WAE Version Nov. 4, 1999, (1999), 26 pgs.
Bye, Gordon J, et al., "Portable Hearing-Related Analysis System", U.S. Appl. No. 10/698,333, filed Oct. 31, 2003, 90 pgs.
Hagen, Lawrence T, "Portable System for Programming Hearing Aids", U.S. Appl. No. 10/842,246, filed May 10, 2004, 53 pgs.
"U.S. Appl. No. 13/953,579, Non Final Office Action mailed Feb. 2, 2015", 30 pgs.

* cited by examiner

HEARING AID SYSTEMS

RELATED APPLICATIONS

This application is a continuation of U.S. patent application Ser. No. 11/212,406, filed Aug. 26, 2005, which is a continuation of U.S. patent application Ser. No. 09/492,913, filed Jan. 20, 2000, both of which are incorprated herein by reference in their entirety.

TECHNICAL FIELD

The present invention relates generally to hearing aid systems. More particularly, it pertains to fitting, programming, or upgrading hearing aid systems.

BACKGROUND INFORMATION

Sound systems can be broken down into three general components: an input device (such as a microphone); a processing system (such as a digital signal processor); and an output device (such as a speaker). Sounds are picked up by the microphone, transmitted to the processing system where they are processed, and then projected by the speaker so that the sounds can be heard at an appropriate distance.

The described sound systems may include a hearing aid device. The hearing aid device serves a patient by picking up desired sounds, processing them, and projecting them into the ear of the patient to facilitate communications. The processing system of the hearing aid device is adjusted to fit a specific patient.

Adjustment of hearing aid devices to fit a patient is laborious and time intensive. An audiologist who is engaged in the fitting of hearing aid devices must, during a session with a patient, have on hand not only hearing aid devices from different manufacturers, but also equipment to adjust the different hearing aid devices. The equipment includes proprietary programming hardware and software, interface hardware, and connector cables from these different manufacturers. The process of reconnecting different interface hardware and connector cables renders the fitting experience frustrating for both the audiologist and the patient.

What has also been frustrating is that there is a lack of a reliable method to ensure that the software on the hearing aid devices or the programming hardware is current. An updated version of software may have been released, but this updated software often does not get installed. This may be due to miscommunications, forward incompatibility between older equipment and newer software, procrastination, or perhaps it is because the audiologist was not trained to maintain a complicated software system. This problem prevents a patient from benefiting from newer software.

Thus, what is needed are systems, methods, and structures to fit, program, or upgrade hearing aid systems.

SUMMARY

The above-mentioned problems with hearing aid systems as well as other problems are addressed by the present invention and will be understood by reading and studying the following specification. Systems, methods, and structures are described which address the problems of programming hearing aid systems.

One illustrative embodiment includes a method. The method includes programming a hearing aid system using at least one wireless communication protocol.

Another illustrative embodiment includes a method for tailoring an audiological therapy for a patient. The method includes deriving at least one audiological parameter by obtaining data about at least one aural response of the patient, and programming a hearing aid system based on the at least one audiological parameter by a mobile device so as to tailor an audiological therapy for the patient.

Another illustrative embodiment includes a business method. The business method includes deriving at least one audiological parameter by obtaining data about at least one aural response of a patient, upgrading a piece of software capable of executing on the hearing aid system based on the at least one audiological parameter, wherein upgrading includes downloading the software by a mobile device. The business method further comprises charging for upgrading the software in the hearing aid system.

Another illustrative embodiment includes a system. The system comprises a hearing aid system and a mobile device adapted to program the hearing aid system. The system further comprises a server adapted to communicate with the mobile device. The system further comprises at least one network to facilitate communications at least among the hearing aid system, the mobile device, and the server.

These and other embodiments, aspects, advantages, and features of the present invention will be set forth in part in the description which follows, and in part will become apparent to those skilled in the art by reference to the following description of the invention and drawings or by practice of the invention.

DETAILED DESCRIPTION

Figure 1:
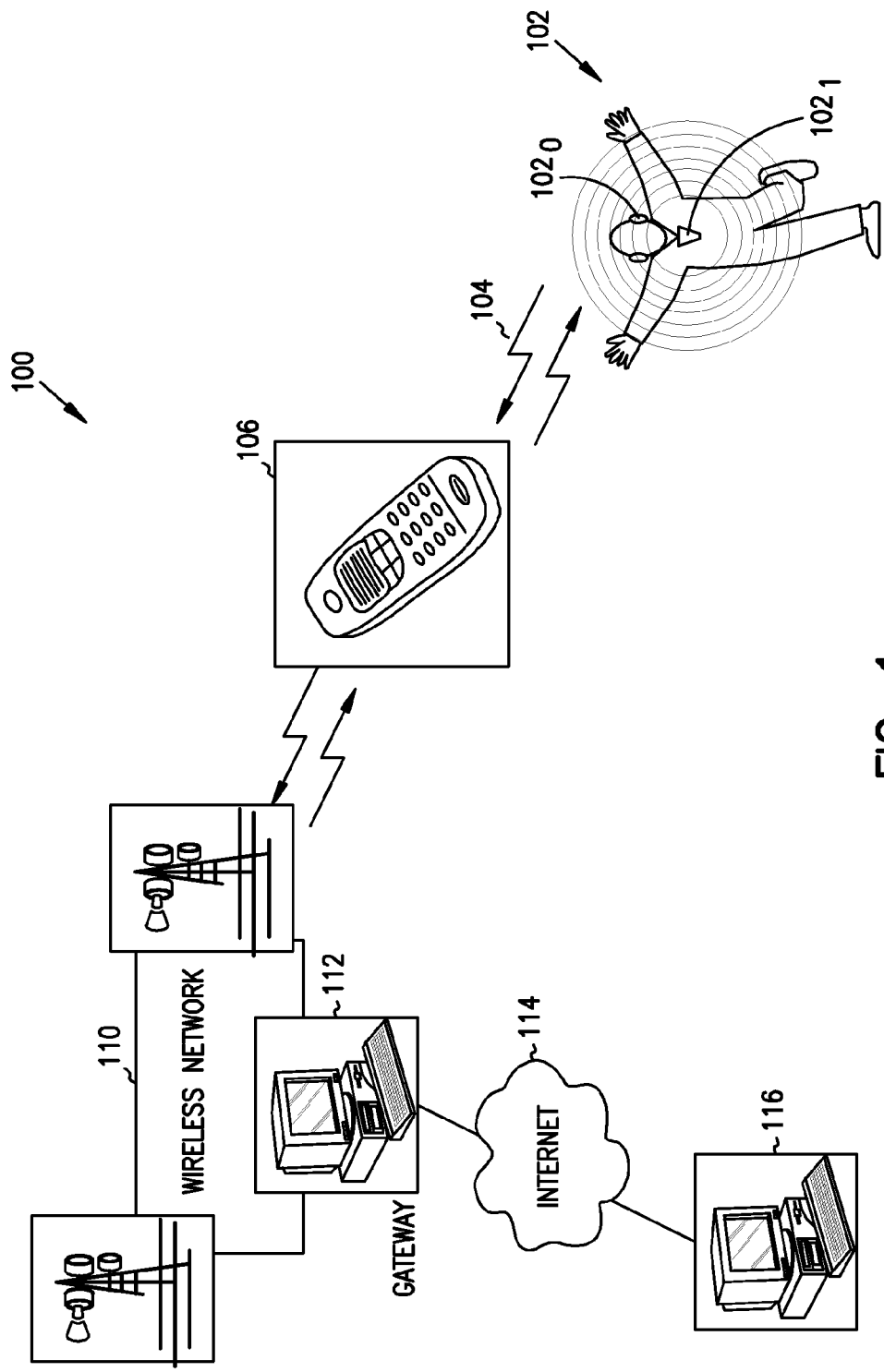
FIG. 1 is a pictorial diagram illustrating a system in accordance with one embodiment.

In the following detailed description of the invention, reference is made to the accompanying drawings that form a part hereof, and in which are shown, by way of illustration, specific embodiments in which the invention may be practiced.

In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The embodiments described herein focus on, among other things, programming hearing aid systems. One component of a hearing aid system includes a processing system. The processing system provides audio signal processing. The audio signal processing includes audiological parameters that may be adjusted so as to enhance the sense of hearing for a patient. This adjustment of the audiological parameters is a tailoring of an audiological therapy for a specific patient.

In tailoring, the patient is tested to obtain aural responses to various conditions. These responses are then used to determine which audiological parameters to adjust as well as the ranges of audiological parameter values that may be adjusted. Different brands of hearing aid may have different audiological parameters. This process of adjustment may be considered a programming of the hearing aid system.

Such programming of the hearing aid system may be accomplished using wireless information technology. Information technology has grown at an unprecedented rate as a result of the synergistic marriage of communication networks and the computer. Milestones in the development of these communication networks have included the wired telephone networks, radio, television, cable, cellular networks, and communication satellites. Computers have made dramatic progress from being hulking machines with human operators to today=s postage-stamp-size integrated circuits. The merging of the communication networks and the computer has replaced the model of forcing workers to bring their work to the machine with a model of allowing anyone to access information on any computers at diverse locations and times.

The programming of hearing aid systems can leverage from that synergy of communication networks and the computer. One consequence of the execution of the described embodiments is that a professional can focus on his/her main task—providing the best audiological therapy to a patient through a hearing aid system—and not focus on managing a complicated software or programming system. The term professional means the inclusion of anyone, such as an audiologist, who is capable and qualified for providing professional services related to providing audiological therapy. This is possible because the embodiments provide the appropriate software and information at the instant they are needed by the professional. In yet other embodiments, diagnostics and adjustment can be made without the immediate presence of a professional. In one embodiment, such diagnostics and adjustment is initiated by a patient. Because of the ability of the patient to initiate remote communication with either a professional or to the central server that comprises an expert system trained in providing audiological therapy, the patient can benefit from diagnostics and adjustments to the hearing aid system even without the presence of a professional. In another embodiment, the diagnostics and adjustment is initiated by the remote server. The following embodiments discuss that and other concepts.

FIG. 1 is a pictorial diagram illustrating a system in accordance with one embodiment. The system 100 includes a hearing aid system 102 that is adapted to wear by a person. The hearing aid system 102 is capable of audio signal processing. Such an audio signal processing system can be used, for example, to tailor the hearing aid system 102 to provide an appropriate audiological therapy for a specific patient. In one embodiment, the hearing aid system 102 comprises a hearing aid device $102_0$. In this embodiment, the hearing aid system 102 may comprise a digital signal processor that is capable of accepting different generations of software. In another embodiment, the hearing aid device $102_0$ is capable of digital audio compression and decompression.

In another embodiment, the hearing aid system 102 comprises a hearing aid device $102_0$ and a programming module $102_1$. The programming module $102_1$ is communicatively coupled to the hearing aid device $102_0$. The term communicatively coupled means the inclusion of wireless coupling or wired coupling. In one embodiment, the hearing aid device $102_0$ and the programming module $102_1$ are each capable of digital audio compression and decompression. In another embodiment, the programming module $102_1$ is capable of sending a test signal to the hearing aid device $102_0$ so as to test for at least one aural response of the patient. In another embodiment, the programming module $102_1$ includes a headset. In another embodiment, the programming module $102_1$ is adapted to provide Bluetooth wireless connectivity, signal processing, and power for programming of the hearing aid device $102_0$. In one embodiment, the programming module $102_1$ is adapted to be worn around the patient=s neck, or integrated into a headset or eyeglass fixture.

The hearing aid system 102 can communicate bi-directionally via a short-range network 104. In one embodiment, the short-range network is a pico-cellular network. In another embodiment, the short-range network includes a network occupying an un-licensed frequency-band. In one embodiment, the short-range network 104 includes wired networking. In another embodiment, the short-range network 104 includes a wireless short-range network such as a radio transmission network or an optical transmission network. One implementation of the radio transmission network includes Bluetooth technology. Bluetooth technology provides a short-range, low-cost radio communication link. Bluetooth may be used to replace wired cables that connect peripherals to this sample of equipment: cellular phones, audio headsets, computer laptops, personal digital assistants, digital cameras, etc. Another implementation of the radio transmission network includes HomeRF, DECT, PHS, or Wireless LAN (WLAN), or other equivalent proprietary wireless communications protocols that do not depart from the present invention.

An optical transmission network provides short-range wireless connectivity for line-of-sight applications. This type of network includes the Infrared Data Associate (IrDA) protocol.

The hearing aid system 102 can communicate with a device 106 facilitated by the short-range network 104. In various embodiments, the device 106 includes a mobile device or a terminal. The term Amobile device@ means the inclusion of a digital cellular telephone, a personal digital assistant, a personal communication and information device. Furthermore, the term Amobile device@ means the inclusion of a handheld device. The term Aterminal@ means the inclusion of a data terminal. The term Apersonal digital assistant@ means the inclusion of a portable personal-computing device. The term Apersonal communication and information device@ means the inclusion of a device capable of mobile communication as well as being capable of functioning as a personal digital assistant. In one embodiment, the device 106 can provide instructions to the hearing aid device $102_0$ so as to tailor the audiological therapy, program existing software, or upgrade to new software. In another embodiment, the device 106 can provide instructions to the programming module $102_1$ so as to tailor the audiological therapy, program existing software, or upgrade to new software. In another embodiment, the device 106 is adapted to store and execute a browser. The term browser means the inclusion of a software environment that is adapted to receive and execute distributed applications, such as applets. The device 106 is adapted to use data service protocol such as General Packet Radio Service (GPRS), High-Speed Circuit-Switched Data Service (HSCSD), Enhanced Data Rate for GSM Evolution (EDGE), Integrated Services Digital Network (ISDN), Universal Mobile Telecommunications System (UMTS), or Cellular Digital Packet Data (CDPD). In one embodiment, the data service protocol can be a wireless data service protocol.

The device 106 can communicate bi-directionally via a long-range wireless network 110. In one embodiment, the long-range wireless network includes cellular network. In another embodiment, the long-range wireless network includes a paging network. In another embodiment, the long-range wireless network includes a multimedia communications network. In another embodiment, the long-range wireless network 110 includes wireless technologies such as Global System for Mobile Communications (GSM), Code Division Multiple Access-One (cdmaOne), Time Division Multiple Access (TDMA), PDC, Japan Digital Cellular (JDC), Universal Mobile Telecommunications System (UMTS), Code Division Multiple Access-2000 (cdma2000), and Digital Enhanced Cordless Telephony (DECT).

A gateway 112 is communicatively coupled to the long-range wireless network 110. The term gateway is understood to mean the inclusion of a device that connects networks using different communications protocols so that information can be passed from one network to the other without incompatibility.

The gateway 112 connects Internet 114 to the long-range wireless network 110. In one embodiment, the term Internet means the inclusion of a worldwide collection of networks and gateways that use the TCP/IP suite of protocols to communicate with one another. In another embodiment, the term Internet means the inclusion of Internet2.

A server 116 is coupled to the Internet 114. In one embodiment, the server 116 is adapted to communicate with the device 106 through the Internet 114 and the long-range wireless network 110. In one embodiment, the device 106 is adapted to synchronize data with the server, such as the personal digital assistant. In another embodiment, the device 106 is adapted to receive an upgraded audiological software from the server 116. In one embodiment, the server 116 includes a database that includes patient data and audiological data associated with at least one type of hearing aid system. The server 116 stores a number of distributed applications, such as Java applications. The term Java application means the inclusion of a Java applet. The term distributed application means the inclusion of an object that can be distributed through mechanisms, such as Java-based distribution techniques, Common Object Request Broker Architecture (CORBA), or Component Object Model (COM). These distributed applications are adapted to interact with the hearing aid system 102.

In one embodiment, these distributed applications, such as a Java applet, are adapted to move from the server 116 to the device 106 to execute on the device 106. In another embodiment, once a distributed application is executed on the device 106, the device 106 may interact with the hearing aid system 102 through the user interface provided by the distributed application. In yet another embodiment, the distributed application when moved to the device 106 would dynamically plug into existing software that includes a user interface already on the mobile device.

When such distributed applications are executing on the device 106, the distributed applications are adapted to receive additional information from the server 116. Such distributed applications are also adapted to send information to the server 116 from the device 106.

In another embodiment, the server 116 receives from the device 106 a patient identification. Based on this patient identification, the server 116 accesses the patient=s medical history and the information regarding the hearing device system being worn by the patient. Next, the server 116 calculates a best fit procedure to obtain programmable audiological parameters for the hearing aid system. These programmable audiological parameters are communicated to the mobile device 106 so as to allow a programming of the hearing aid system.

One of the various benefits of the heretofore described embodiments include allowing the professional to access the most relevant software and information to aid him/her in his/her task of providing the best audiological therapy through a hearing aid system for a patient. This is possible because the embodiments allow storage of the software and information on a central server. The professional can thus access the information anywhere he needs to be to provide professional services needed by the patient. Another benefits of the heretofore described embodiments include the upgrading of software in the processing component (not shown) of the hearing aid system 102.

Figure 2:
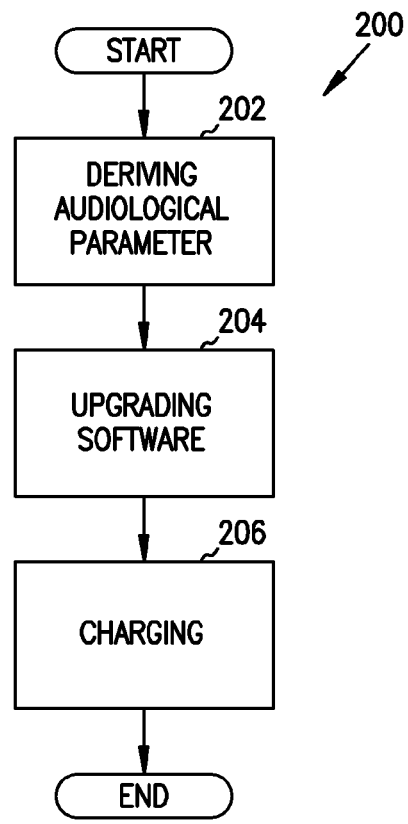
FIG. 2 is a process diagram illustrating a method in accordance with one embodiment.

FIG. 2 is a process diagram illustrating a method in accordance with one embodiment. Process 200 is a business method. At block 202, the process 200 includes deriving at least one audiological parameter by testing a patient to obtain at least one aural response. The term aural response means the inclusion of a result obtained by applying a series of tests on the patient; one test may include sending audio test signals and measuring the response of the patient to those audio test signals. Once sufficient aural responses are obtained, the business method derives at least one audiological parameter. The term audiological parameter means the inclusion of an adjustable parameter of an audio signal processing component of a hearing aid system; although certain audiological parameters are general and are available for adjustment across different types of hearing aid systems, other audiological parameter may be specific for a particular brand and made of a hearing aid system.

The process 200 includes upgrading software capable of executing on the hearing aid system. The upgrading of the software depends at least on the audiological parameter or audiological parameters that were derived in block 202. In one embodiment, such audiological parameters serve as an index into a database containing the appropriate software that can be used to upgrade existing software executing on the hearing aid system. In one embodiment, the database resides on a server. In one embodiment, the software stores in the database is adapted to be distributable. Such software is adapted to be downloadable to a mobile device that is communicatively coupled to the server. At least one network is engaged to facilitate the communication between the mobile device and the hearing aid system and the server.

The process 200 includes charging at block 206 for upgrading the software in the hearing aid system. Such charging includes identifying the patient, identifying the patient=s health care insurance, identifying the type of hearing device worn by the patient, and identifying the type of therapy needed by the patient. The charging may be accomplished using a billable account or through a credit-card transaction.

Figure 3:
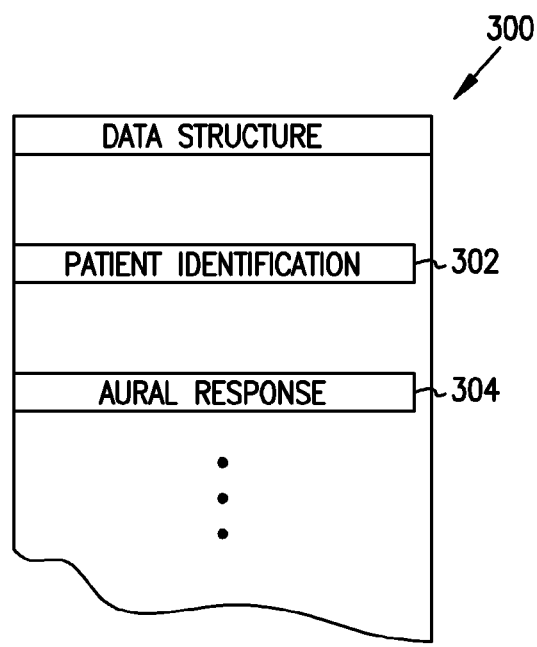
FIG. 3 is a structure diagram illustrating a data structure in accordance with one embodiment.

FIG. 3 is a structure diagram illustrating a data structure in accordance with one embodiment. The structure 300 includes a data structure to store a patient identification 302. The implementation of patient identification 302 includes using any type of data structure including a class or a structure. The structure 300 includes a data structure to store an aural response 304. The implementation of the aural response 304 includes using any type of data structure, such as an array or a linked list.

The structure 300 is adapted to be uploaded from a mobile device to a server through at least one network. In one embodiment, the structure 300 is adapted for tailoring an audiological therapy for the patient.

Figure 4:
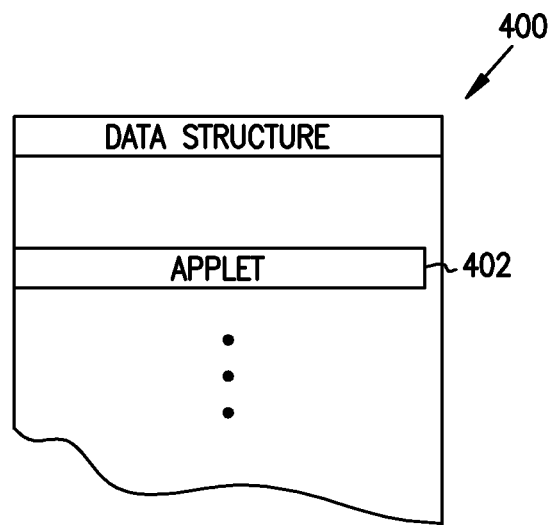
FIG. 4 is a structure diagram illustrating a data structure in accordance with one embodiment.

FIG. 4 is a structure diagram illustrating a data structure in accordance with one embodiment. The structure 400 includes a data structure to store a distributed application, such as an applet 402. The applet 402 is adapted to be executed on a device to interact with a hearing aid system so as to tailor an audiological therapy. The applet 402 is also adapted to be downloadable to a mobile device from a server on at least one type of network.

Figure 5:
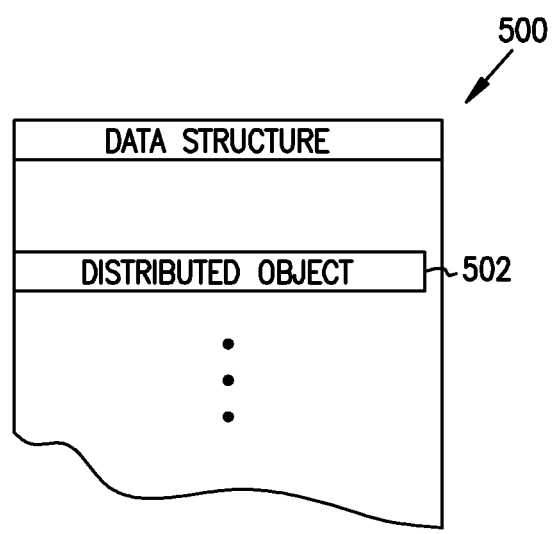
FIG. 5 is a structure diagram illustrating a data structure in accordance with one embodiment.

FIG. 5 is a structure diagram illustrating a data structure in accordance with one embodiment. The structure 500 includes a data structure to store a distributed application, such as a distributed object 502. The distributed object 502 is adapted to be executed on a device to interact with a hearing aid system so as to tailor an audiological therapy. The distributed object 502 is also adapted to be downloadable to a mobile device from a server on at least one type of network.

Figure 6:
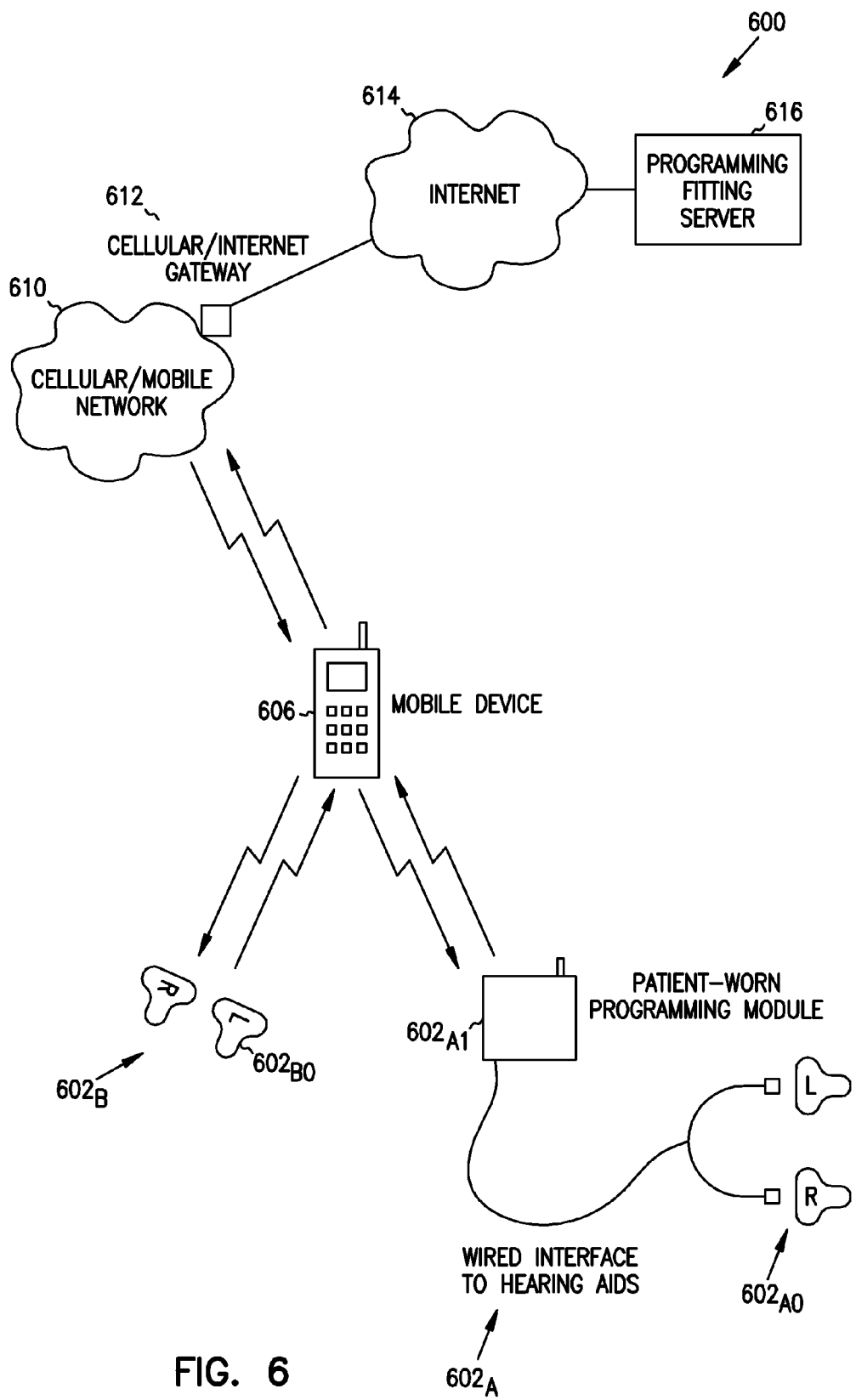
FIG. 6 is a pictorial diagram illustrating a system in accordance with one embodiment.

FIG. 6 is a pictorial diagram illustrating a system in accordance with one embodiment. FIG. 6 contains elements similar to those discussed in FIG. 1. For these elements, the aforementioned discussion related to them is incorporated here in full. The system 600 includes hearing aid systems $602_A$ and $602_B$. The hearing aid system $602_A$ comprises a programming module $602_{A1}$ and a hearing aid device $602_{A0}$. The hearing aid system $602_B$ comprises the hearing aid device $602_{B0}$. Whereas a mobile device 606 communicates with the hearing aid device $602_{A0}$ of the hearing aid system $602_A$ through the programming module $602_{A1}$, the mobile device 606 communicates directly with the hearing aid device $602_{B0}$ of the hearing aid system $602_B$.

For illustrative purposes only, suppose a patient is being fitted with the hearing aid system $602_B$. During the fitting process, a piece of software may be executed on the mobile device 606 to interact with the patient wearing the hearing aid system $602_B$. Such interaction includes sending audio test signals from the software executing on the mobile device 606 to the hearing aid system $602_B$. Such software includes a user interface. The aural response from the patient is either automatically sent back to the testing software by the hearing aid system $602_B$ or is recorded manually into the testing software through the mobile device 606. Once sufficient aural responses are collected, in one embodiment, such aural responses are sent to a programming fitting server 616 through the cellular/mobile network 610 and the Internet 614; in another embodiment, such aural responses are formatted to form an audiogram before sending the information to the programming fitting server 616. The term audiogram means the inclusion of profiling from the aural responses so as to obtain the extent of the hearing loss of the patient. The programming fitting server 616 derives at least one audiological parameter from the aural responses. Such audiological parameters are used to tailor an audiological therapy, to program existing audiological software, or to upgrade existing audiological software. For the purpose of this illustration, the programming fitting server 616 derives an adjustment to an audio signal processing component of the hearing aid system $602_B$. Such adjustment incrementally tailors an audiological therapy provided by the hearing aid system $602_B$ so that the hearing aid system $602_B$ fits the patient.

The foregoing illustrative discussion is also applicable in an embodiment that includes the hearing aid system $602_A$.

Figure 7:
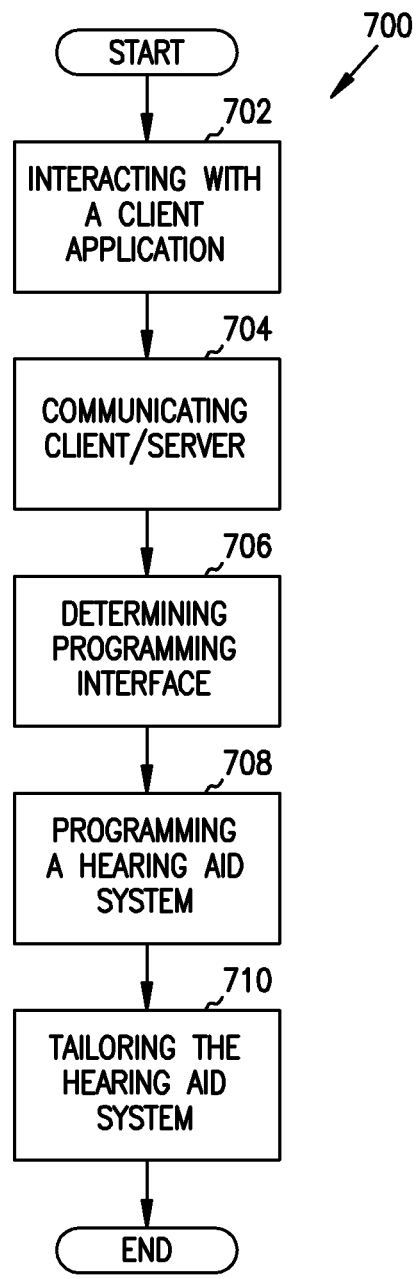
FIG. 7 is a process diagram illustrating a method in accordance with one embodiment.

FIG. 7 is a process diagram illustrating a method in accordance with one embodiment. Process 700 includes, at block 702, interacting with a client application that is executing on a mobile device. In one embodiment, the mobile device is adapted to communicate using a wireless protocol or a Wireless Access Protocol. The term Wireless Access Protocol (WAP) means the inclusion of an open communications standard (protocol and mark-up language) designed to bring Internet access and other value-added services to a mobile device. WAP defines an application environment (mark-up and programming language) and an application protocol. The application protocol allows WAP applications to be downloaded to mobile devices on demand and removed when no longer in use.

The act of interacting includes entering an identification of a patient, entering an identification of a type of hearing aid system that is being fitted or worn by the patient, or recording aural responses of the patient to audio test signals.

The process 700 includes, at block 704, communicating with a server application that is executing on a server. In one embodiment, the server is coupled to the Internet. The client application is adapted to communicate with the server application through a long-range wireless network. The act of communicating includes uploading information gathered during the act of interacting, such as the identification of the patient. The act of communicating further includes communicating with the client application to download information such as a programming interface.

The process 700 includes, at block 706, determining at least one programming interface to program the hearing aid system. The act of determining includes using at least the type of the hearing aid system to derive the programming interface. The term programming interface means the inclusion of an application programming interface for a specific type of hearing aid system; the application programming interface includes a set of audiological parameters that may be adjusted so as to fit the hearing aid system to the patient.

The process 700 includes, at block 708, programming the hearing aid system. The act of programming includes adjusting the set of audiological parameters through the application programming interface. The act of programming may also include downloading new software to replace the existing software in the hearing aid system. The act of programming may further include downloading an incremental upgrade to the existing software in the hearing aid system.

The process 700 includes, at block 710, tailoring the hearing aid system to the patient by adjusting at least one programming interface by the client application. The act of tailoring includes the incremental adjustment of the hearing aid system so that the hearing aid system fits the patient.

The foregoing discussion is also applicable to an embodiment where a client application is executing on a terminal.

Figure 8:
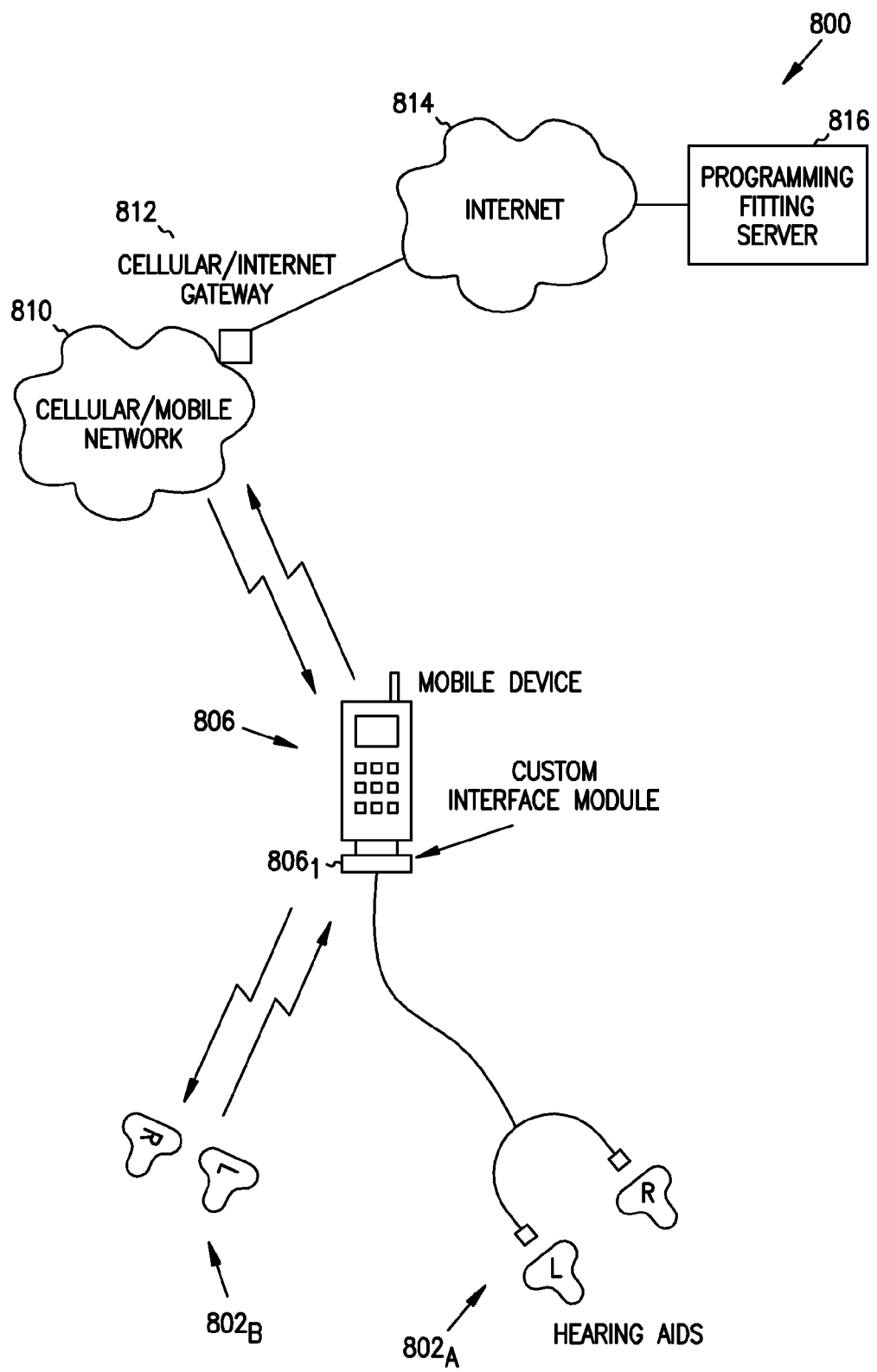
FIG. 8 is a pictorial diagram illustrating a system in accordance with one embodiment.

FIG. 8 is a pictorial diagram illustrating a system in accordance with one embodiment. FIG. 8 contains elements similar to those discussed in FIGS. 1 and 6. The aforementioned discussion of those similar elements is incorporated here in full. System 800 includes a custom interface module $806_1$. The custom interface module $806_1$ is adapted to be communicatively coupled to the mobile device 806. In one embodiment, the custom interface module $806_1$ is adapted to be wirelessly communicable with the hearing aid system $802_B$. In another embodiment, the custom interface module $806_1$ is adapted to be wiredly communicable with the hearing aid system 802$_A$. Such custom interface module 806$_1$ may be implemented using Bluetooth technology or other equivalent technologies to provide a proprietary wireless interface directly to the hearing aid systems 802$_A$ or 802$_B$. One implementation of the customer interface module 806$_1$ includes using a serial or data port (not shown) of the mobile device 806.

In various embodiments, a client application executing on the mobile device 806 can interact with the hearing aid systems 802$_A$ or 802$_E$ through the custom interface module 806$_1$. The client application may be in communication with a server application executing on a programming fitting server 816 through an Internet 814, gateway 812, and cellular/mobile network 810.

Figure 9:
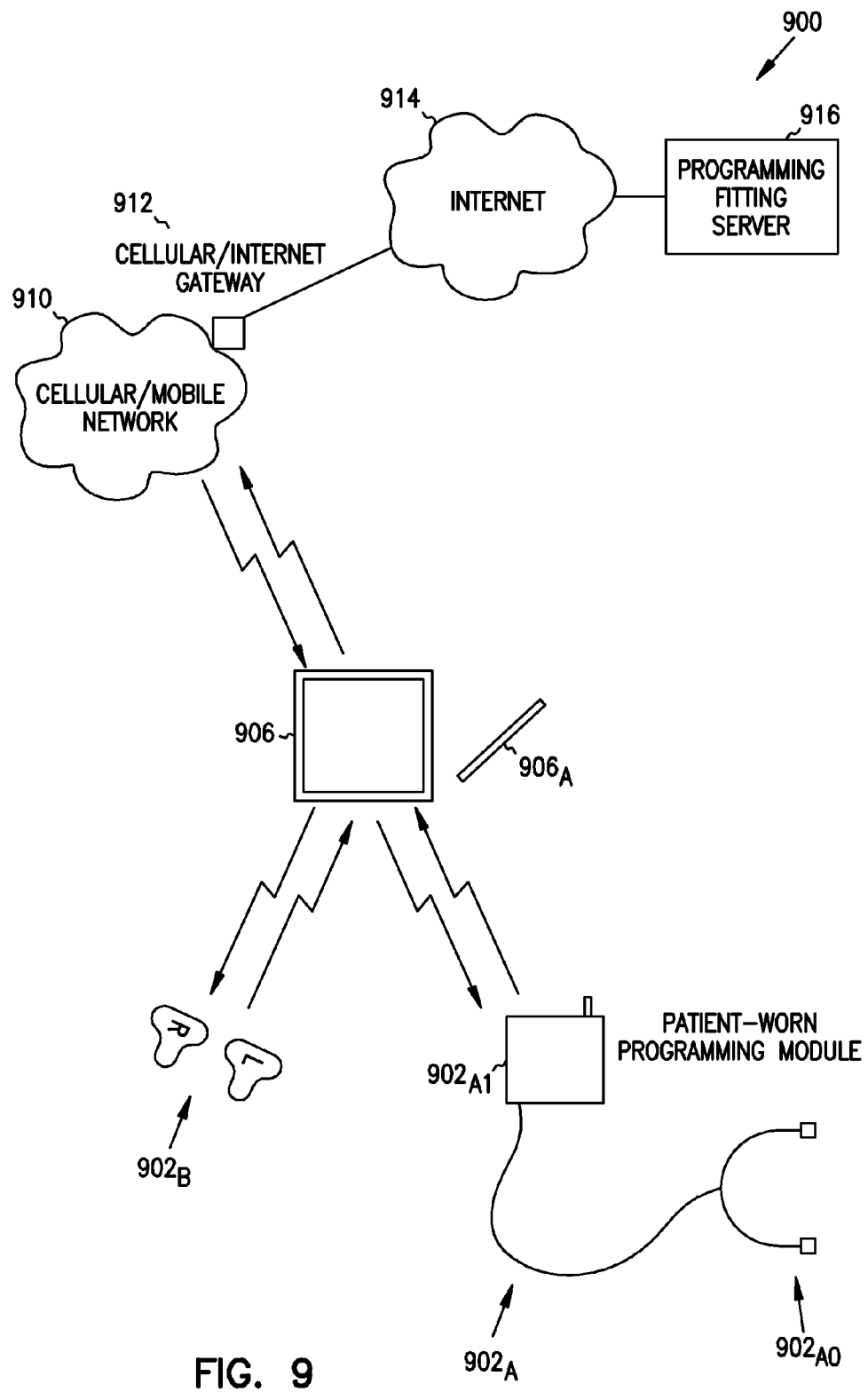
FIG. 9 is a pictorial diagram illustrating a system in accordance with one embodiment.

FIG. 9 is a pictorial diagram illustrating a system in accordance with one embodiment. FIG. 9 contains elements similar to those discussed in FIGS. 1, 6, and 8. The aforementioned discussion of those elements is incorporated here in full. System 900 includes a personal communication and information device (PCID) 906 or a personal digital assistant with wireless communication capability. In one embodiment, the PCID 906 is adapted to communicate wirelessly using technology such as Bluetooth or IrDA. The PCID 906 includes a pen 906$_A$. The pen 906$_A$ is an inputting device adapted to interact with the user interface of the PCID 906.

In various embodiments, the PCID 906 is adapted to communicate with hearing aid systems 902$_A$ or 902$_B$ using a short-range wireless network. The hearing aid system 902$_A$ includes a hearing aid device 902$_{A0}$ and a programming module 902$_{A1}$. The PCID 906 is also adapted to communicate with a programming fitting server 916. Such communication may occur over a cellular/mobile network 910, gateway 912, and Internet 914.

In any embodiments that include the PCID 906, the PCID 906 can send audio test signals to the hearing aid systems 902$_A$ or 902$_B$. Such audio test signals are compressed before transmission. Once these compressed audio test signals are received by either the hearing aid systems 902$_A$ or 902$_B$, the audio test signals are decompressed. These test signals are then presented to the patient. In yet any other embodiments that include the PCID 906, the PCID 906 can send instructions to the hearing aid systems 902$_A$ or 902$_B$. Based on the instructions, the hearing aid systems 902$_A$ or 902$_B$ generates the audio test signals using its audio signal processing capability.

Figure 10:
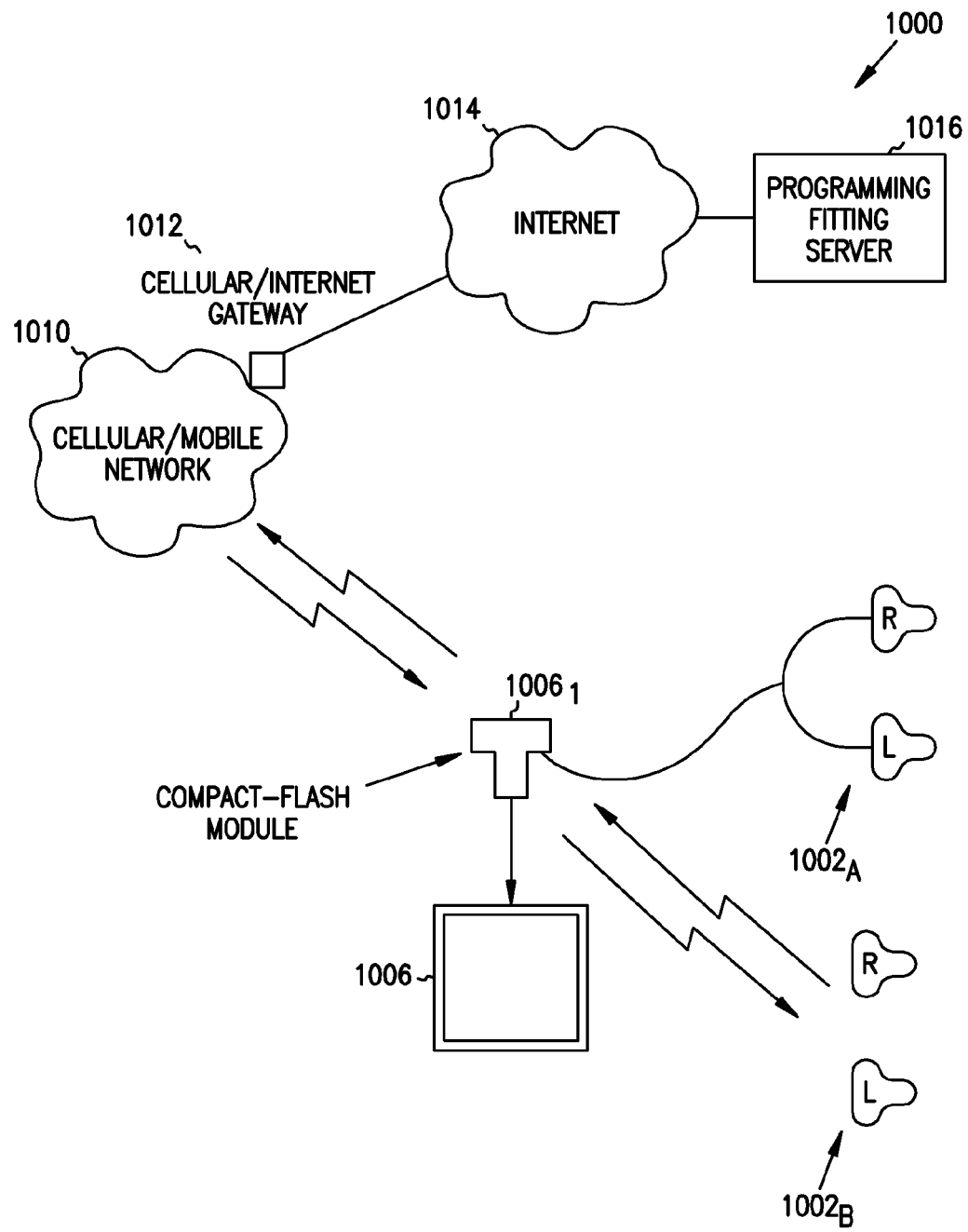
FIG. 10 is a pictorial diagram illustrating a system in accordance with one embodiment.

FIG. 10 is a pictorial diagram illustrating a system in accordance with one embodiment. FIG. 10 contains elements similar to those discussed in FIGS. 1, 6, 8, and 9. The aforementioned discussion of those elements is incorporated here in full. System 1000 includes a personal communication and information device (PCID) 1006 or a personal digital assistant with wireless communication capability. In one embodiment, the PCID 1006 includes a PCMIA module. In another embodiment, the PCID 1006 includes a CompactFlash module 1006$_1$. The CompactFlash module 1006$_1$ is communicatively coupled to hearing aid systems 1002$_A$ and 1002$_B$. In one embodiment, the CompactFlash module 1006$_1$ is implemented using short-range wireless technology, such as Bluetooth. In another embodiment, the CompactFlash module 1006$_1$ is adapted to be used even when the PCID 1006 lacks short-range wireless ability. The PCID 1006 is also adapted to communicate with a programming fitting server 1016. Such communication may occur over a cellular/mobile network 1010, gateway 1012, and Internet 1014.

Figure 11:
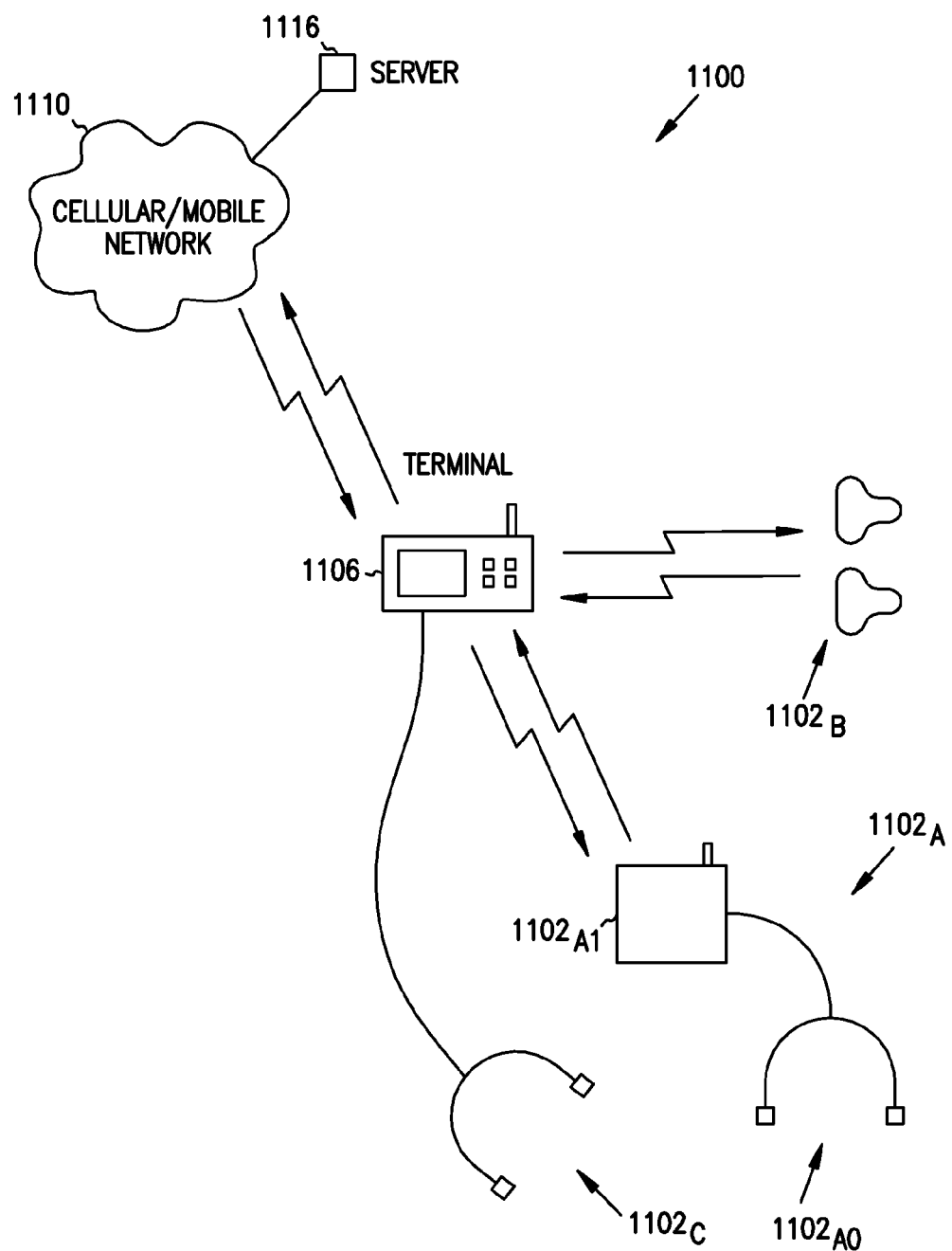
FIG. 11 is a pictorial diagram illustrating a system in accordance with one embodiment.

FIG. 11 is a pictorial diagram illustrating a system in accordance with one embodiment. FIG. 11 contains elements similar to those discussed in FIGS. 1, 6, 8, 9, and 10. The aforementioned discussion of those elements is incorporated here in full. System 1100 includes a terminal 1106. The term terminal means the inclusion of a data terminal. In one embodiment, the terminal 1106 is adapted to use a data service protocol such as General Packet Radio Service (GPRS), High-Speed Circuit-Switched Data Service (HSCSD), Enhanced Data Rate for GSM Evolution (EDGE), Integrated Services Digital Network (ISDN), Universal Mobile Telecommunications System (UMTS), or Cellular Digital Packet Data (CDPD).

The terminal 1106 is adapted to communicate with hearing aid systems 1102$_A$, 1102$_B$, and 1102$_C$ through at least one short-range network. In various embodiments, the short-range network includes a radio communication network such as Bluetooth, an optical communication network such as Infrared Data Association (IrDA) protocol, or a wired communication network. In one embodiment, the short-range network is a wireless network.

In various embodiments, the hearing aid systems 1102$_A$, 1102$_B$, and 1102$_C$ include a hearing aid device. In various embodiments, the hearing aid systems 1102$_A$, 1102$_B$, and 1102$_C$ are adapted to be capable of audio signal processing. In various embodiments, the hearing aid systems 1102$_A$, 1102$_B$, and 1102$_C$ are adapted to be capable of digital audio compression and decompression. The hearing aid system 1102$_A$ includes a hearing aid device 1102$_{A0}$ and a programming module 1102$_{A1}$. The programming module 1102$_{A1}$ is adapted to communicate with the hearing aid device 1102$_{A0}$ so as to receive at least one programming instruction from the terminal 1106 to program the hearing aid device 1102$_{A0}$. In all embodiments described above and below, the hearing aid system 1102$_A$ may include a headset. The headset is capable of detecting and communicating ambient information to a server application so as to provide additional information to fit, program, or upgrade the audiological software of the hearing aid system 1102$_A$. In another embodiment, the programming module 1102$_{A1}$ is implemented as a headset. The programming module 1102$_{A1}$ is adapted to be capable of sending a test audio signal to the hearing aid so as to test at least one aural response of a patient.

The terminal 1106 is also adapted to communicate wirelessly using a long-range wireless network 1110. In various embodiments, the long-range wireless network includes various wireless technologies such as Global System for Mobile Communications (GSM), Code Division Multiple Access-one (cdmaOne), Time Division Multiple Access (TDMA), PDC, Universal Mobile Telecommunications System (UMTS), Code Division Multiple Access-2000 (cdma2000), and Digital Enhanced Cordless Telephony (DECT).

The terminal 1106 is adapted to communicate with a server 1116 through the long-range wireless network 1110. The server 1116 contains distributed applications, such as a distributed object that is adapted to interact with hearing aid systems 1102$_A$, 1102$_B$, and 1102$_C$. The distributed object is adapted to move from the server 1116 to the terminal 1106 so as to execute on the terminal 1106 to interact with the hearing aid systems 1102$_A$, 1102$_B$, and 1102$_C$. In one embodiment, the distributed object can receive information from the server 1116 and can transmit information to the server 1116. In one embodiment, the terminal 1106 includes a software environment, such as a browser, that is capable of receiving a distributed object. Such a distributed object can execute on the terminal 1106 so as to interact with the hearing aid systems 1102$_A$, 1102$_B$, and 1102$_C$. In a further embodiment, the server 1116 includes a database that includes patient data and audiological data associated with at least one type of hearing aid system. In one embodiment, the terminal 1106 is a customized or application specific device.

Figure 12:
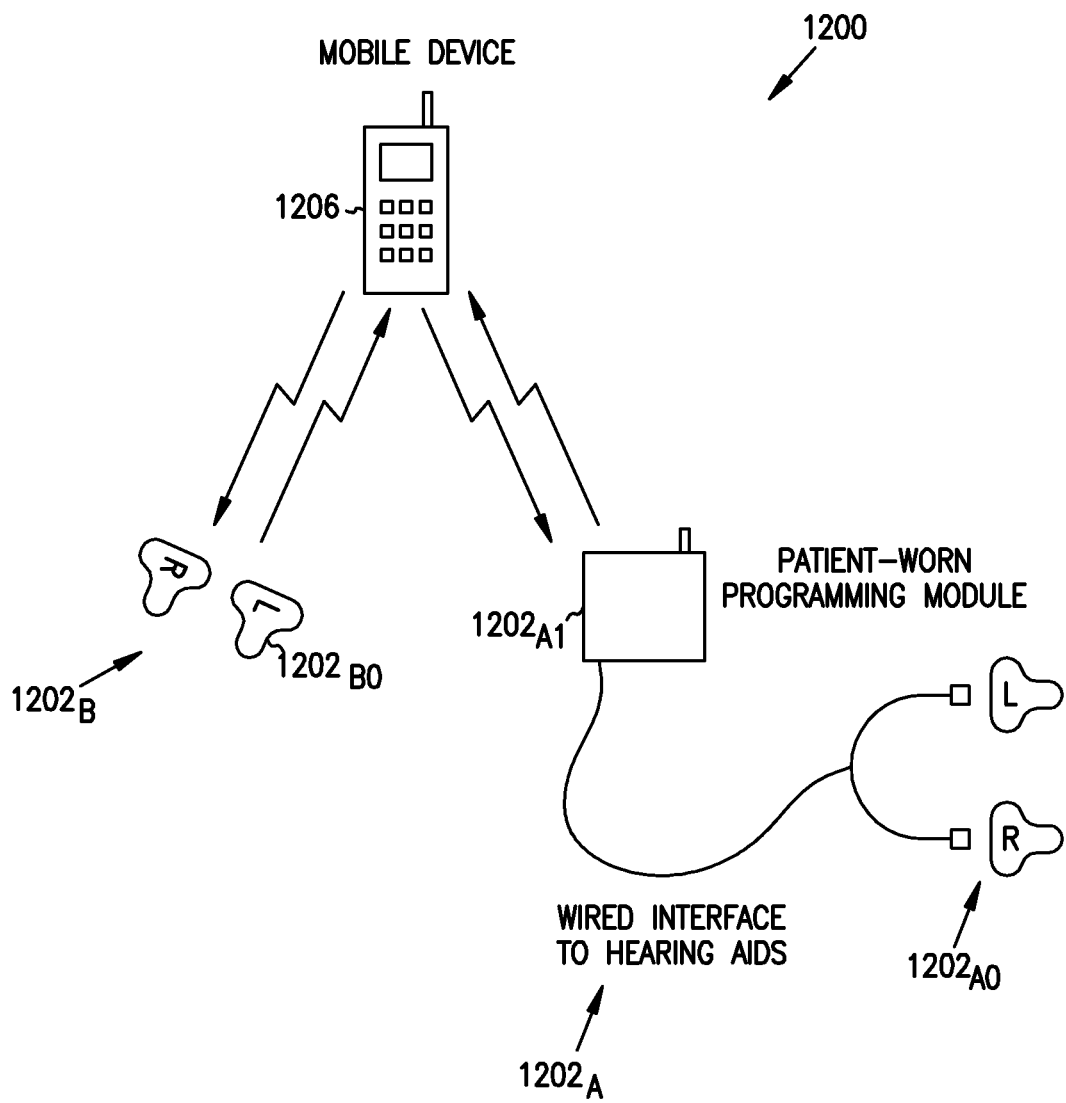
FIG. 12 is a pictorial diagram illustrating a system in accordance with one embodiment.

FIG. 12 is a pictorial diagram illustrating a system in accordance with one embodiment. FIG. 12 contains elements similar to those discussed in FIG. 6. For these elements, the aforementioned discussion related to them is incorporated here in full. The system 1200 includes hearing aid systems $1202_A$ and $1202_B$. The hearing aid system $1202_A$ comprises a programming module $1202_{A1}$ and a hearing aid device $1202_{A0}$. The hearing aid system $1202_B$ comprises the hearing aid device $1202_{B0}$. Whereas a mobile device 1206 communicates with the hearing aid device $1202_{A0}$ of the hearing aid system $1202_A$ through the programming module $1202_{A1}$, the mobile device 1206 communicates directly with the hearing aid device $1202_{B0}$ of the hearing aid system $1202_B$.

In this embodiment, the mobile device 1206 contains all the software and information to interact with either hearing aid systems $1202_A$ and $1202_B$ without having to interact with a server. In such embodiment, the mobile device 1206 can derive at least one audiological parameter from the aural responses obtained from the patient. As previously discussed, such audiological parameters are used to tailor an audiological therapy, to program existing audiological software, or to upgrade existing audiological software.

Figure 13:
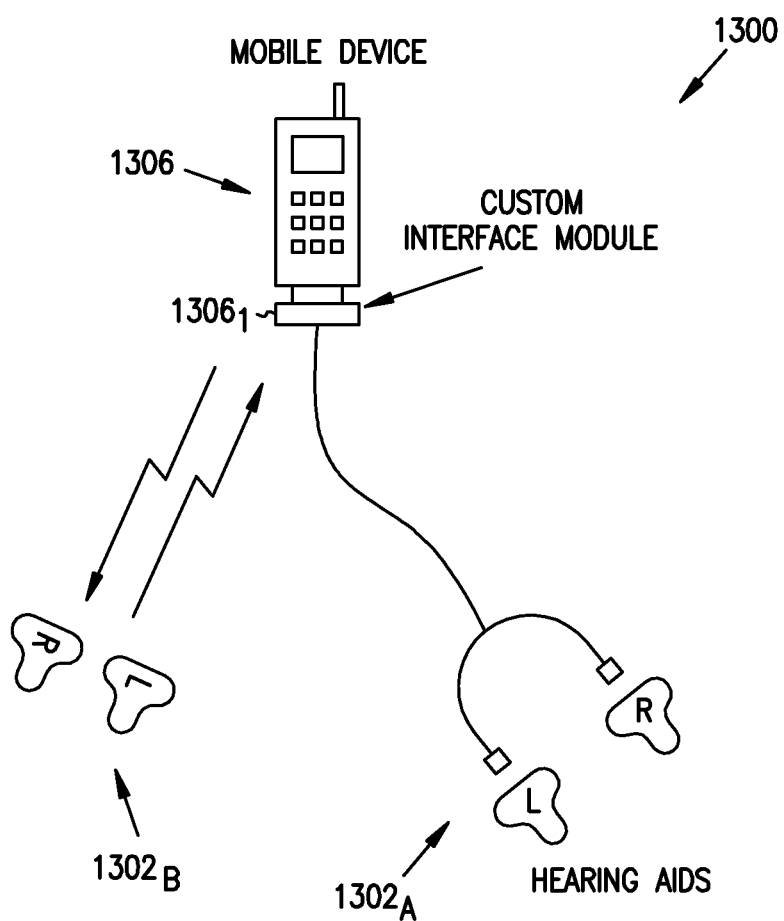
FIG. 13 is a pictorial diagram illustrating a system in accordance with one embodiment.

FIG. 13 is a pictorial diagram illustrating a system in accordance with one embodiment. FIG. 13 contains elements similar to those discussed in FIG. 8. The aforementioned discussion of those similar elements is incorporated here in full. System 1300 includes a custom interface module $1306_1$. The custom interface module $1306_1$ is adapted to be communicatively coupled to the mobile device 1306. In one embodiment, the custom interface module $1306_1$ is adapted to be wirelessly communicable with the hearing aid system $1302_B$. In another embodiment, the custom interface module $1306_1$ is adapted to be wiredly communicable with the hearing aid system $1302_A$.

In this embodiment, both the client and server applications reside on the mobile device 806. Thus, the mobile device 806 does not necessarily need to interact with a server.

Figure 14:
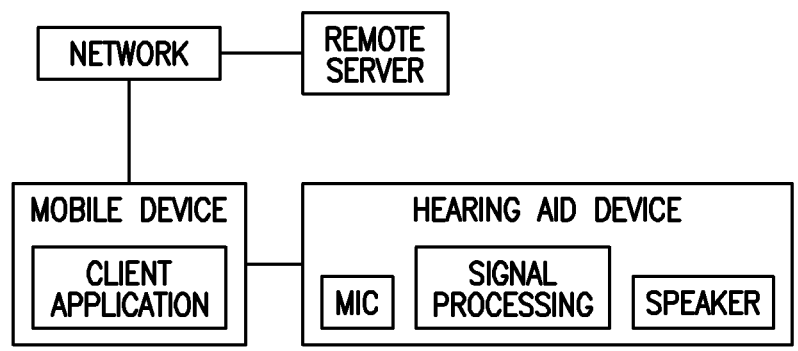
FIG. 14 illustrates an embodiment of a system that includes a hearing aid device, a mobile device and a remote server.

FIG. 14 illustrates an embodiment of a system that includes a hearing aid device, a mobile device and a remote server. The mobile device is adapted to use of packets of data to communicate with a remote server through a network. The hearing aid device is adapted to be worn by a user. The hearing aid device includes a microphone, a speaker, and a signal processing system connected to the microphone and the speaker. A client application is adapted to operate on the mobile device to communicate packetized data with the hearing aid device and the remote server. The client application is adapted to use at least one digital communication protocol to digitally communicate packetized data.

CONCLUSION

Thus, systems, devices, structures, and methods have been described for fitting, programming, or upgrading hearing aid systems. In the embodiments where wireless communication is used, the processes of fitting, programming, and upgrading hearing aid systems may avoid the frustration of prior process due to the myriad of programming equipment. The equipment used in the described processes may benefit from running the most recent and relevant version of software. The equipment may also benefit from the ability to process data remotely or synchronizing of data. Professionals who are engaged in these processes may benefit from the ability to access a central database to store information as well as access patient and account information. Also, by leveraging the economy of scale offered by wireless information technology, the embodiments provide a solution that is low cost. This is the case because wireless information technology is often built into mass-marketed mobile devices such as a cellular telephone.

Although the specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A method to be performed using a mobile device and a non-transitory application with executable instructions to be executed by the mobile device, the method comprising:
   receiving, using the mobile device and the application to be executed by the mobile device, digital transmissions through a wireless cellular network; and
   transmitting, using the mobile device including the application to be executed by the mobile device, digital audio through a wireless short-range communication link to a hearing aid that is fitted to a hearing-impaired patient and that is configured to be worn in or near an ear of the hearing-impaired patient, the hearing aid including:
      a microphone to pick up sound and produce an audio signal;
      a processing system capable of processing the audio signal from the microphone into a processed signal tailored to fit the hearing-impaired patient and capable of processing the digital audio from the mobile device into the processed signal tailored to fit the hearing-impaired patient; and
      a speaker to convert the processed signal into an output audio signal and present the output audio signal to the hearing-impaired patient,
   wherein the mobile device is a digital cellular telephone, and the method further comprises using the digital telephone and the application to be executed by the digital telephone to access an Internet connection through the wireless cellular network and to communicate with a server through the cellular network and through the Internet connection.

2. The method of claim 1, wherein receiving digital transmissions through the wireless cellular network includes receiving packets of digital data.

3. The method of claim 2, wherein receiving packets of digital data includes receiving packets of digital audio data.

4. The method of claim 1, wherein transmitting digital audio includes transmitting packets of digital audio.

5. The method of claim 4, further comprising using the application executed by the mobile device to program the processing system of the hearing aid to fit the hearing-impaired patient.

6. The method of claim 1, wherein the non-transitory application with executable instructions to be executed by the mobile device includes a downloaded application that is downloaded by the mobile device through the wireless cellular network.

7. The method of claim 1, wherein the digital telephone is configured to store and execute a browser, the method further comprising using the browser and Internet communication to access the server.

8. The method of claim 1, wherein the wireless short-range communication link includes a Bluetooth digital wireless protocol.

9. A non-transitory application including executable instructions to be executed by a mobile device to:
receive, using the mobile device, digital transmissions through a wireless cellular network; and
transmit, using the mobile device, digital audio through a wireless short-range communication link to a hearing aid that is fitted to a hearing-impaired patient and that is configured to be worn in or near an ear of the hearing-impaired patient, the hearing aid including:
a microphone to pick up sound and produce an audio signal;
a processing system capable of processing the audio signal from the microphone into a processed signal tailored to fit the hearing-impaired patient and capable of processing the digital audio from the mobile device into the processed signal tailored to fit the hearing-impaired patient; and
a speaker to convert the processed signal into an output audio signal and present the output audio signal to the hearing-impaired patient,
wherein the mobile device includes a digital cellular telephone, the application to be executed by the digital telephone to use the digital telephone to access an Internet connection through the wireless cellular network, and to use Internet communication to communicate with a server through the cellular network and through the Internet connection.

10. The non-transitory application of claim 9, wherein the digital telephone is configured to store and execute a browser.

11. The non-transitory application of claim 9, the application including executable instructions to be executed by the mobile device to transmit, using the mobile device and the application to be executed by the mobile device, packets of digital audio.

12. The non-transitory application of claim 9, the application including executable instructions to be executed by the mobile device to transmit, using the mobile device and the application to be executed by the mobile device, digital audio through a Bluetooth digital wireless protocol.

13. The non-transitory application of claim 9, the application including executable instructions to be executed by the mobile device to program the processing system of the hearing aid to fit the hearing-impaired patient.

14. The non-transitory application of claim 9, wherein the non-transitory application is a downloaded application that is downloaded by the mobile device through the wireless cellular network.

15. A system, comprising:
a hearing aid configured to be worn in or near an ear of a hearing-impaired patient; and
a mobile device configured to:
receive digital transmissions through a wireless cellular network, and
transmit digital audio through a wireless short-range communication link to the hearing aid;
the hearing aid including:
a microphone to pick up sound and produce an audio signal;
a processing system capable of processing the audio signal from the microphone into a processed signal tailored to fit the hearing-impaired patient and capable of processing the digital audio from the mobile device into the processed signal tailored to fit the hearing-impaired patient; and
a speaker to convert the processed signal into an output audio signal and present the output audio signal to the hearing-impaired patient,
wherein the mobile device includes a digital cellular telephone and the digital telephone is configured to access an Internet connection through the wireless cellular network, and to use Internet communication to communicate with a server through the cellular network and through the Internet connection.

16. The system of claim 15, wherein the digital cellular telephone is configured to store and execute a browser.

17. The system of claim 15, wherein the mobile device is configured to program the processing system of the hearing aid to fit the hearing-impaired patient.

18. The system of claim 15, wherein the mobile device is configured to download an application through the wireless cellular network, store the downloaded application in the mobile device, and execute the downloaded application to receive the digital transmissions and transmit the digital audio to the hearing aid.

19. The system of claim 15, wherein received digital transmissions include digital data, and the mobile device is configured to transmit the digital data through the wireless short-range communication link to the hearing aid.

* * * * *